(12) United States Patent
Horn

(10) Patent No.: US 11,169,427 B2
(45) Date of Patent: Nov. 9, 2021

(54) METHOD AND DEVICE FOR POLARIZATION ENTANGLED PHOTON PAIR CREATION

(71) Applicant: OZ Optics Ltd., Ottawa (CA)

(72) Inventor: Rolf Horn, Maryhill (CA)

(73) Assignee: OZ Optics Ltd., Ottawa (CA)

(*) Notice: Subject to any disclaimer, the term of this patent is extended or adjusted under 35 U.S.C. 154(b) by 0 days.

(21) Appl. No.: 17/262,611

(22) PCT Filed: Jul. 23, 2019

(86) PCT No.: PCT/CA2019/051012
§ 371 (c)(1),
(2) Date: Jan. 22, 2021

(87) PCT Pub. No.: WO2020/019068
PCT Pub. Date: Jan. 30, 2020

(65) Prior Publication Data
US 2021/0263391 A1 Aug. 26, 2021

Related U.S. Application Data

(60) Provisional application No. 62/701,931, filed on Jul. 23, 2018.

(51) Int. Cl.
G02F 1/35 (2006.01)
G02F 1/355 (2006.01)

(52) U.S. Cl.
CPC .......... *G02F 1/3517* (2013.01); *G02F 1/3553* (2013.01)

(58) Field of Classification Search
CPC .................................................. G02F 1/3553
See application file for complete search history.

(56) References Cited

U.S. PATENT DOCUMENTS

| | | | | |
|---|---|---|---|---|
| 7,639,953 | B2* | 12/2009 | Spillane | B82Y 10/00 398/176 |
| 8,222,623 | B2* | 7/2012 | Trojek | G02F 1/3526 250/493.1 |
| 9,235,101 | B2* | 1/2016 | Silverstone | H04B 10/70 |
| 9,720,437 | B2* | 8/2017 | Gilbert | G02F 1/0136 |
| 10,620,503 | B2* | 4/2020 | Qian | G02F 1/3526 |

(Continued)

OTHER PUBLICATIONS

Horn, et al., "Auto-balancing and robust interferometer designs for polarization entangled photon sources," Optics Express, vol. 27, No. 12, Jun. 10, 2019, p. 17369-17376.

(Continued)

*Primary Examiner* — Rhonda S Peace
(74) *Attorney, Agent, or Firm* — Dickinson Wright PLLC

(57) ABSTRACT

This disclosure is directed at a method and device capable of producing polarization entangled photon pairs and accomplishing polarization insensitive wavelength conversion. The device includes a double displacement interferometer, the interferometer of which contains an input beam displacing section including a plurality of orthogonally oriented optical beam displacing elements; a wavelength conversion section including a plurality of orthogonally oriented non-linear optical wavelength converters; an output beam recombination section including a plurality of orthogonally oriented optical beam displacing elements.

11 Claims, 22 Drawing Sheets

(56) References Cited

U.S. PATENT DOCUMENTS

2008/0037996 A1   2/2008   Spillane et al.

OTHER PUBLICATIONS

Evans, et al., "Bright source of spectrally uncorrelated polarization-entangled photons with nearly single-mode emission," Phys. Rev. Lett. 105, 253601, Dec. 13, 2010.
Fiorentino, et al., "Compact sources of polarization-entangled photons," Optics Express, vol. 16, No. 24, p. 20149-20156, Nov. 21, 2008.
International Search Report dated Oct. 8, 2019.

* cited by examiner

Reference Co-Moving Co-ordinate System

Optical direction of beam is $\vec{Z}$ direction, positive is into the page ⊗

First Stage common configuration

Second stage common configuration

3rd Stage Type-1 Degenerate Configuration

Figure 11
3rd Stage Type 2 Degenerate Configuration
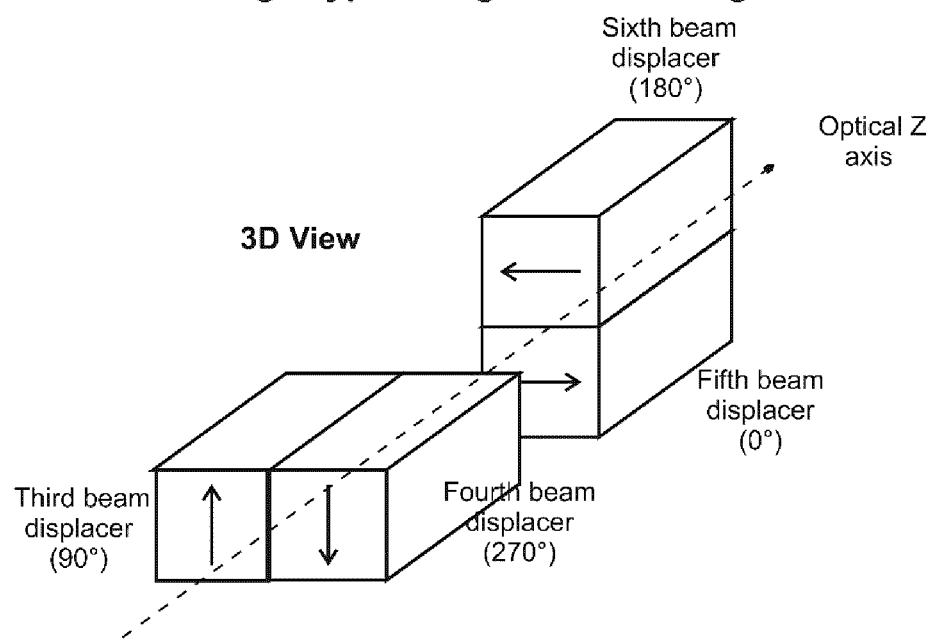
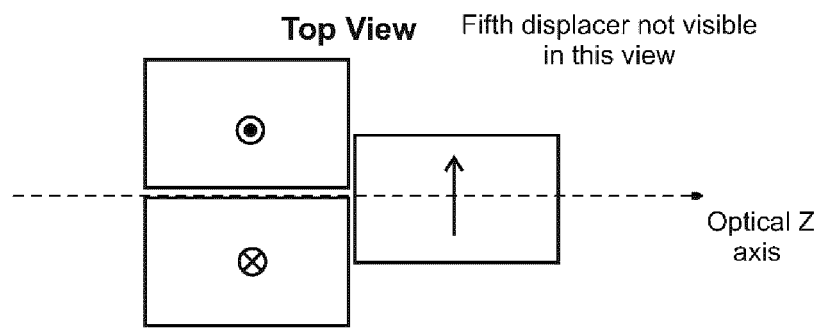

Figure 13

Optical Description of first stage input beam displacement configuration

| Symbol | Label | |
|---|---|---|
| ▢ | 1 | Diagonally polarized pump photons begin in SE quadrant location |
| ▢ | 2 | H polarized pump component has been displaced to SW quadrant |
| (two beams) | 3 | V polarized pump component has been displaced to NE quadrant. Two optical beams exit the first stage. |

Figure 14

Optical Description of 2nd stage wavelength conversion configuration

| Symbol | Label | |
|---|---|---|
| ▢ | 3 | Position of twin pump beams before entering the 2nd stage common configuration consisting of pair of wavelength conversion crystals (shown as filled squares) |
| ▢ | 3A | Position and polarizations of photons exiting the 2nd stage configuration for Type 0 phase matched wavelength conversion |
| ▢ | 3B | Position and polarizations of photons exiting the 2nd stage configuration for Type 1 phase matched wavelength conversion |
| ▢ | 3C | Position and polarizations of photons exiting the 2nd stage configuration for Type 2 phase matched wavelength conversion |

Figure 15

Optical Description-type 0

In the Type 0 case, pairs produced in each down conversion crystal are co-polarized with pump photons

| Symbol | Label | Degenerate Description |
|---|---|---|
|  | 4A | Pump and down converted photons about to undergo recombination in the third displacement stage. |
|  | 5A | V polarized photons are displaced back to SE quadrant |
|  | 6A | H polarized photons are displaced back to SE quadrant. Polarization Entanglement is created (symbolized with '?'). Pump photon also shown |

| Symbol | Label | Non-Degenerate Description |
|---|---|---|
|  | 4As | Pump and signal photons about to undergo displacement in the signal direction |
|  | 5As | V polarized signal photons are displaced to SE quadrant. |
|  | 6As | H polarized signal photons are displaced to SE quadrant. Polarization entanglement is created (symbolized with '?'). Diagonally polarized pump also shown. |
|  | 4Ai | Idler photons about to undergo displacement in the idler direction |
|  | 5Ai | V polarized idler photons are displaced to the SE quadrant |
|  | 6Ai | H polarized idler photons are displaced to SE quadrant. Polarization entanglement is created (symbolized by '?') |

Figure 16

Optical Description-type 1

In the Type 1 case, pairs produced in each down conversion crystal are orthogonally polarized with pump photons

| Symbol | Label | Degenerate Description |
|---|---|---|
|  | 4B | Pump and down converted photons about to undergo recombination in the third displacement stage. |
|  | 5B | V polarized pairs are displaced to NW quadrant. V polarized pump is displaced out of NE quadrant. |
|  | 6B | H polarized pairs are displaced to NW quadrant. H polarized pump is displaced out of SW quadrant. Polarization entanglement is created (symbolized with '?'). |

| Symbol | Label | Non-Degenerate Description |
|---|---|---|
|  | 4Bs | Pump and signal photons about to undergo displacement in the signal direction |
|  | 5Bs | V polarized signal photons are displaced to NW quadrant. V polarized pump is displaced out of NE quadrant. |
|  | 6Bs | H polarized signal photons are displaced to NW quadrant. H polarized pump is displaced out of SW quadrant. Polarization entanglement is created (symbolized with '?'). |
|  | 4Bi | Idler photons about to undergo displacement in the idler direction |
|  | 5Bi | V polarized idler photons are displaced to the NW quadrants |
|  | 6Bi | H polarized idler photons are displaced to NW quadrant. Polarization entanglement is created (symbolized by '?') |

Figure 17

Optical Description-type 2

In the Type 2 case, pairs produced in each down conversion crystal are both orthogonal and co-polarized with pump photons

| Symbol | Label | Degenerate Description |
|---|---|---|
| | 4C | Pump and photon pairs about to enter the pair of side by side displacers. |
| | 5C | Pump and photon pairs about to enter the pair of top/bottom displacers. V polarized photons have been displaced to both the NW and SE quadrants. |
| | 6C | H polarized photons have been displaced to both the NW and SE quadrant. Polarization entanglement is created (symbolized by '?') Pump photon also shown. |

| Symbol | Label | Non-Degenerate Description |
|---|---|---|
| | 4Cs | Pump and signal photons about to undergo displacement in the signal direction |
| | 5Cs | V polarized signal / pump photons are displaced to the SE quadrants |
| | 6Cs | H polarized signal / pump photons are displaced to SE quadrant. Polarization entanglement is created (symbolized by '?') Pump photon also shown. |
| | 4Ci | Idler photons about to undergo displacement in the idler direction |
| | 5Ci | V polarized idler photons are displaced to the NW quadrants |
| | 6Ci | H polarized idler photons are displaced to NW quadrant. Polarization entanglement is created (symbolized by '?') |

Figure 18
Double displacement interferometer for degenerate type-0 phase matched wavelength conversion
Sectional view indicating the positions of the various beams at different stages in the device along the optical direction
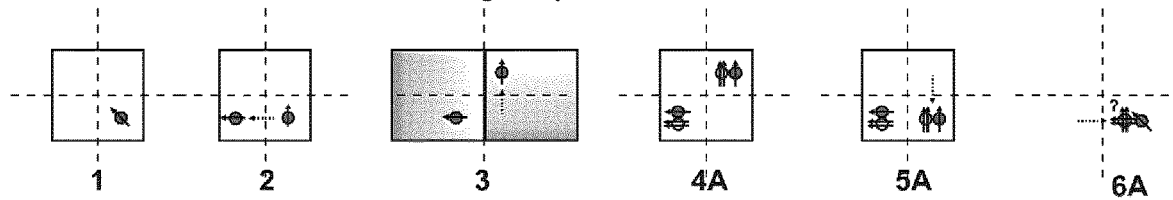
Top View
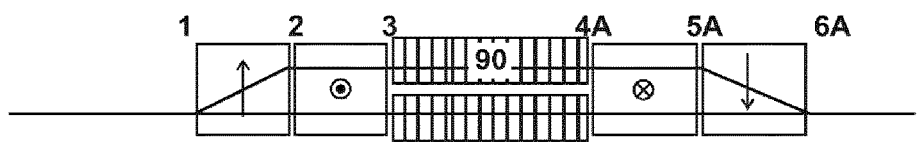

Double Displacement Interferometer for non-degenerate type-0 phase matched wavelength conversion

Sectional View

Sectional view indicating the positions of the various beams at different stages in the device along the optical direction Figure 20
Double Displacement Interferometer for degenerate type-1 phase matched wavelength conversion
Sectional View
Sectional view indicating the positions of the various beams at different stages in the device along the optical direction
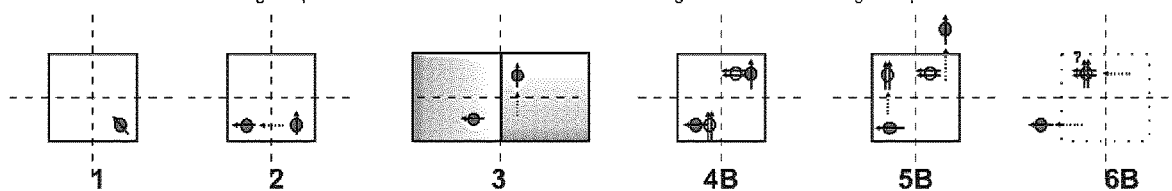
1  2  3  4B  5B  6B
Top View
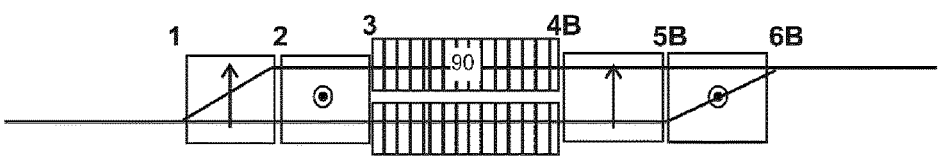
1  2  3  4B  5B  6B Figure 22
Double Displacement interferometer for degnerate type-2 phase matched wavelength conversion
Sectional View
Sectional view indicating the positions of the various beams at different stages in the device along the optical direction
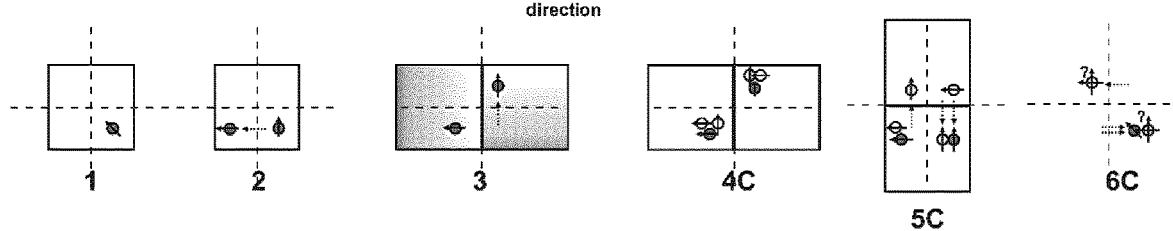
Top View
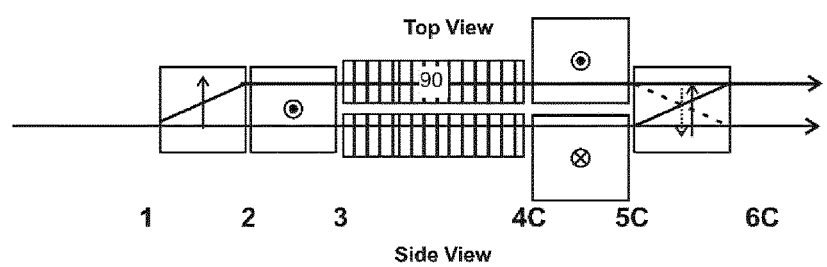
Side View
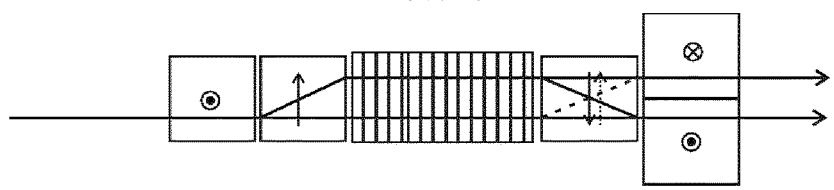

Double Displacement Interferometer for non-degenerate type-2 phase matched wavelength conversion

Fiber coupled wavelength conversion device with double displacement interferometer and supporting optics: Type 0 Degenerate. Device 10.

Fiber coupled wavelength conversion device with double displacement interferometer and supporting optics: Type 0 Non-Degenerate. Device 20.

Fiber coupled wavelength conversion device with double displacement interferometer and supporting optics: Type 1 Degenerate. Device 30.

METHOD AND DEVICE FOR POLARIZATION ENTANGLED PHOTON PAIR CREATION

CROSS-REFERENCE TO OTHER APPLICATIONS

The current application claims priority from U.S. Provisional Application No. 62/701,931 filed Jul. 23, 2018 which is hereby incorporated by reference.

FIELD OF DISCLOSURE

This disclosure relates to the fields of telecommunications and quantum communication. Wavelength conversion is a technique that has found extensive use in the field of optical quantum information science. As an example, passive three wave mixing using non-linear optical material is routinely used to create quantum states of light called entangled photon pairs. One type of entanglement is in the polarization degree of freedom. Passive devices or sources which provide for the creation of this type of entanglement can often be used bi-directionally: the optical inputs and outputs can be interchanged. Used in one orientation, they produce polarization entangled photon pairs. Used in the reverse orientation, they can convert classical light in a polarization insensitive manner.

This disclosure is motivated by the need for a method and device to reliably and easily provide for the creation of polarization entangled photon pairs or accomplish polarization independent wavelength conversion. This disclosure is directed at a novel Mach Zehnder interferometer configuration that is balanced for both the input unconverted light and the output converted light that may also be referred to as a double displacement interferometer.

DESCRIPTION OF FIGURES AND DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

FIG. 11 shows the physical layout of the third stage type 2 degenerate configuration;

Figure 19:
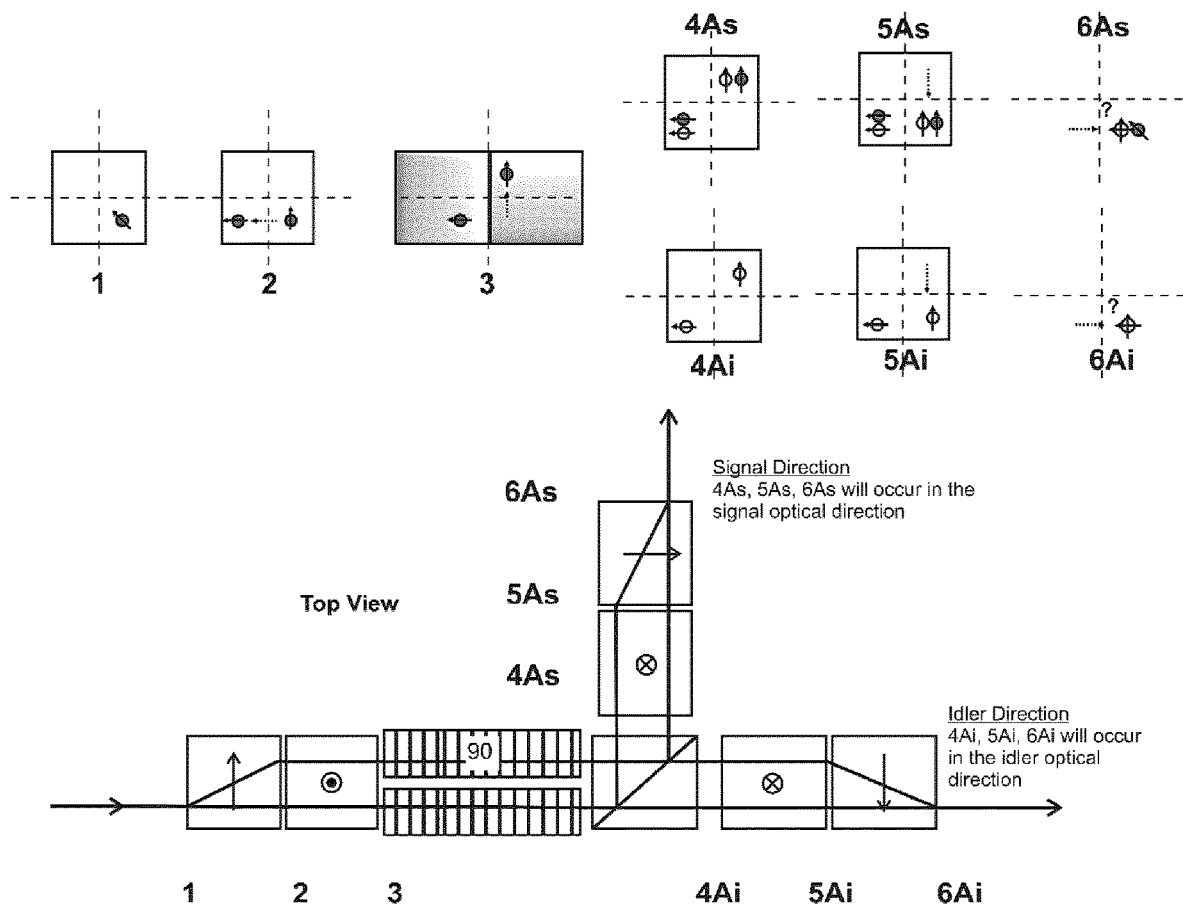
Figure 21:
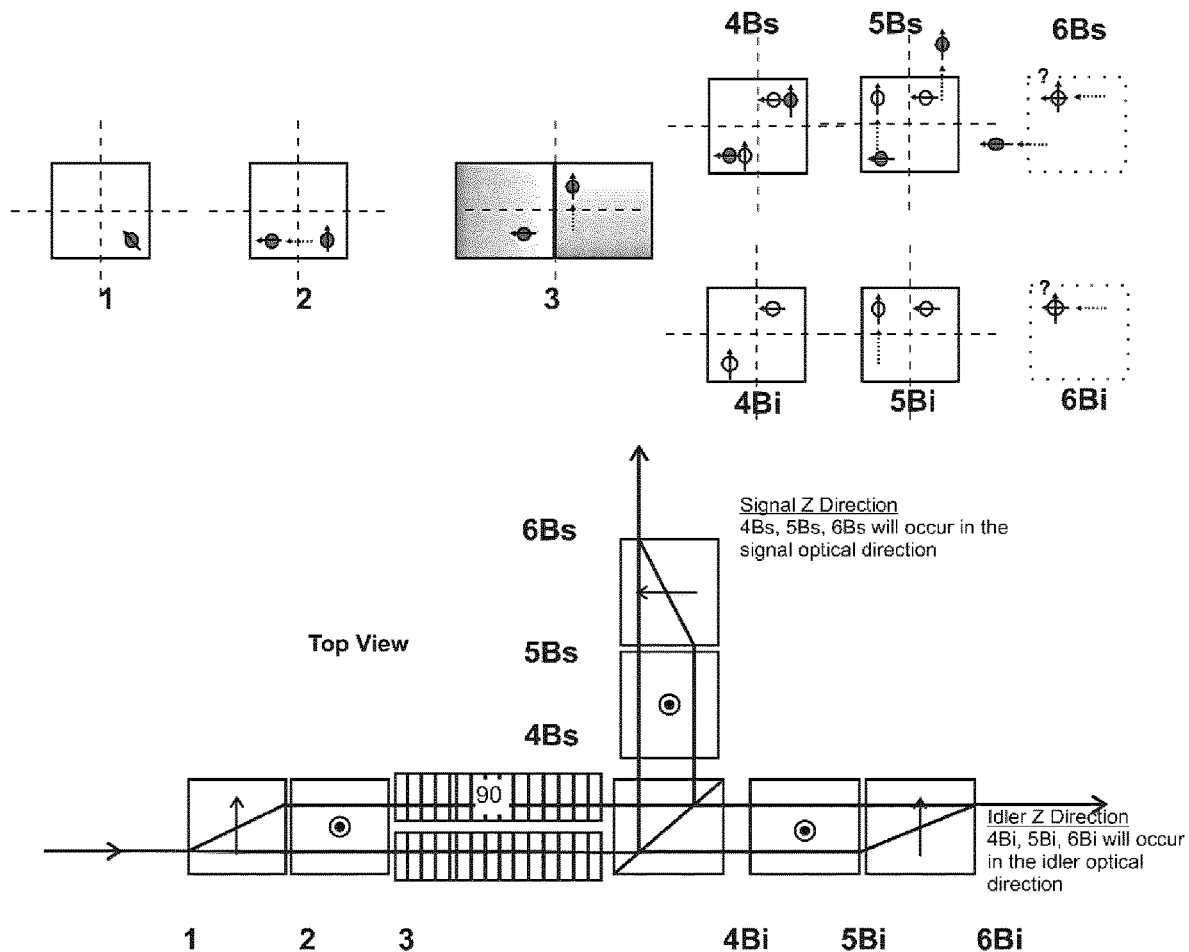
Figure 23:
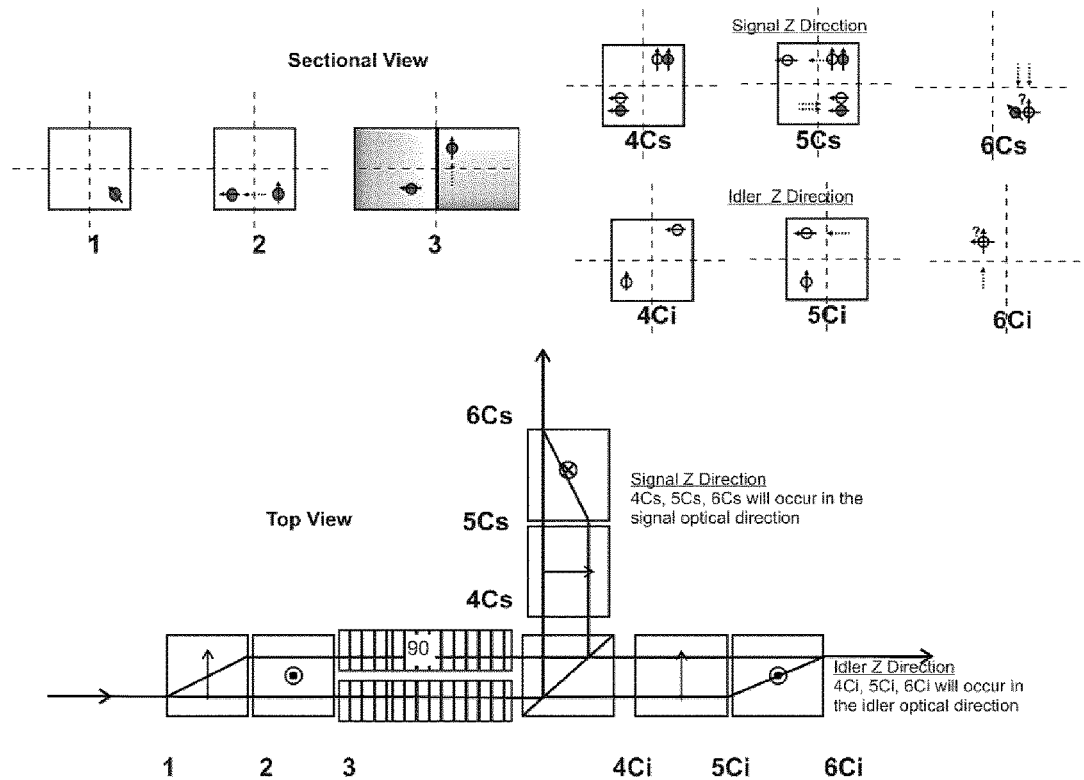
Figure 24:
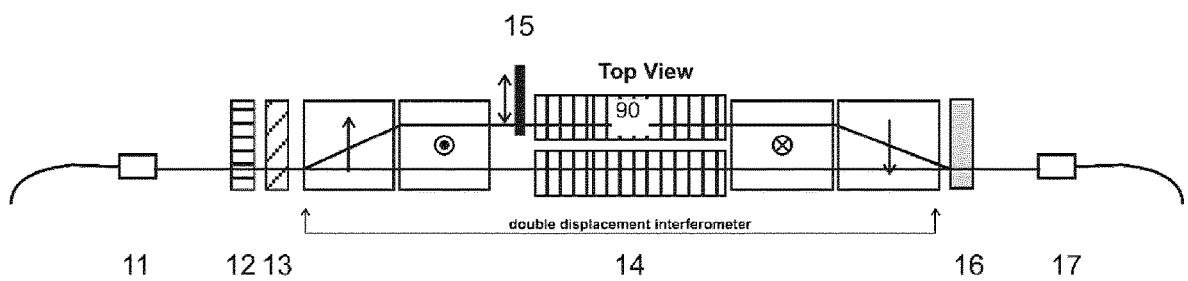
Figure 25:
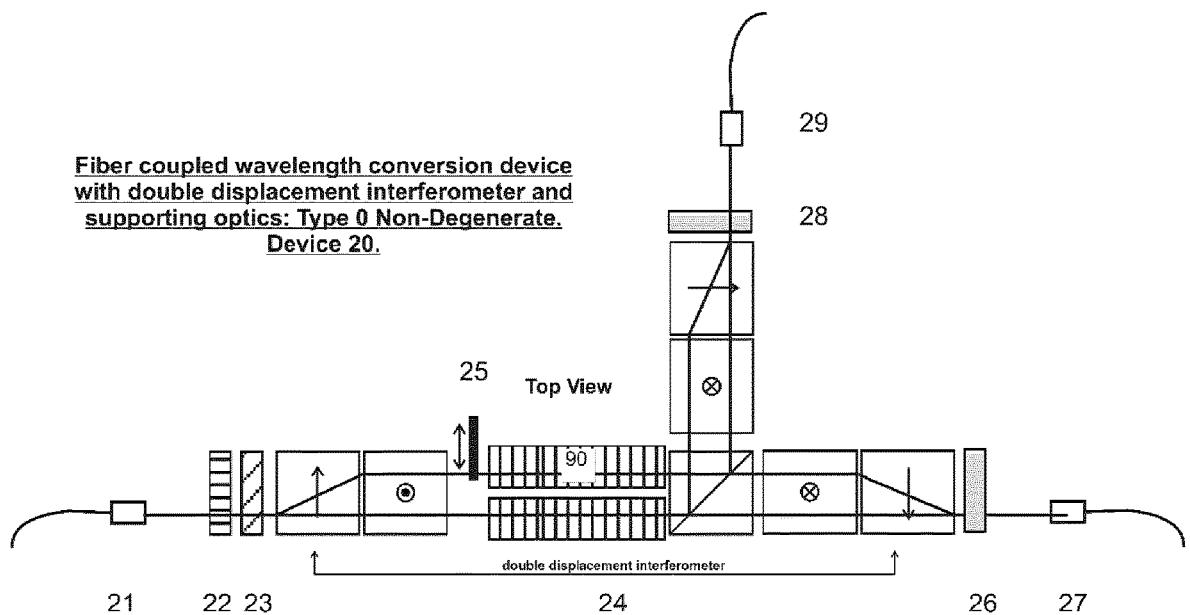
Figure 26:
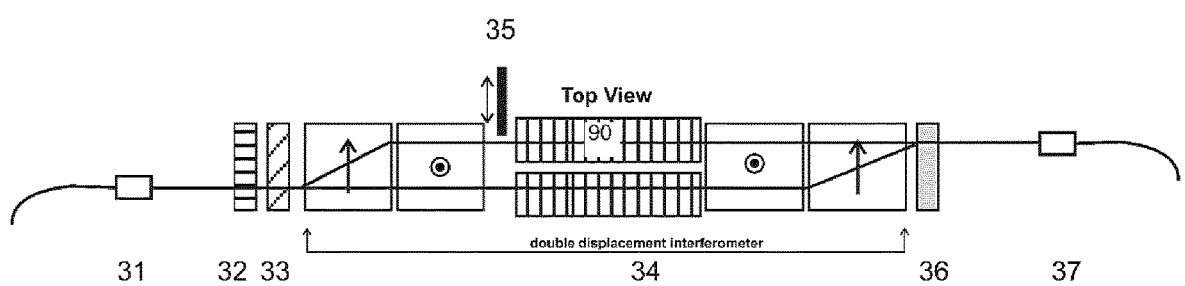
Figure 27:
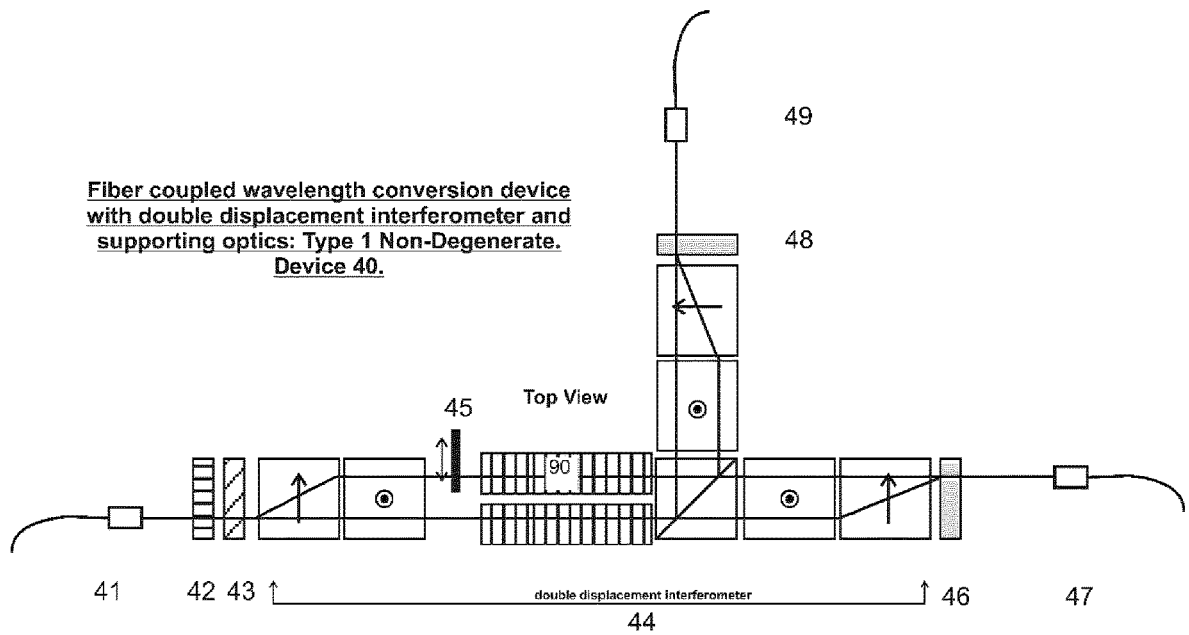
Figure 28:
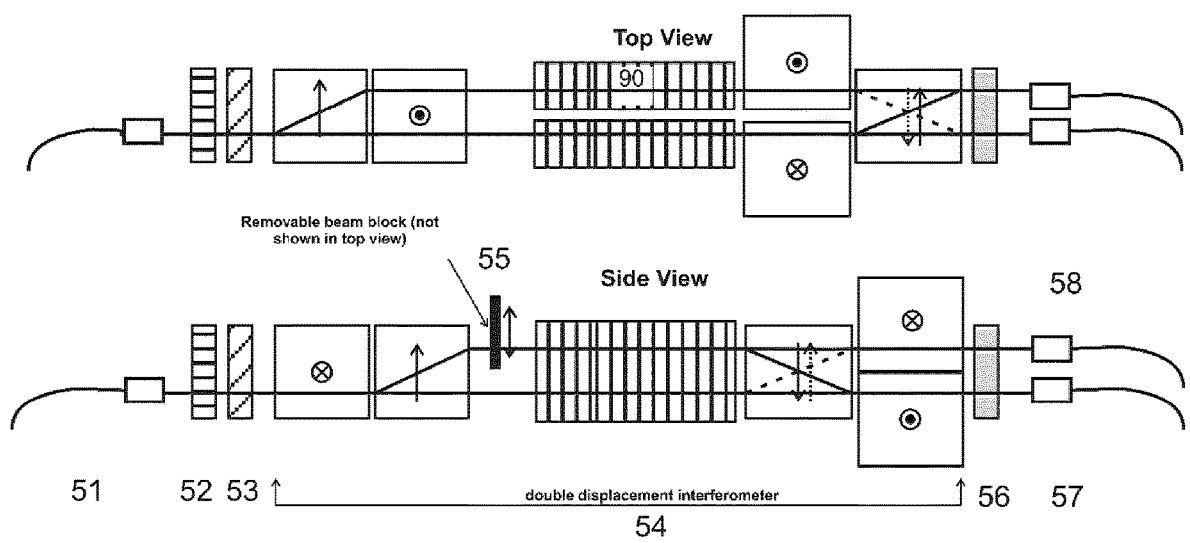
Figure 29:
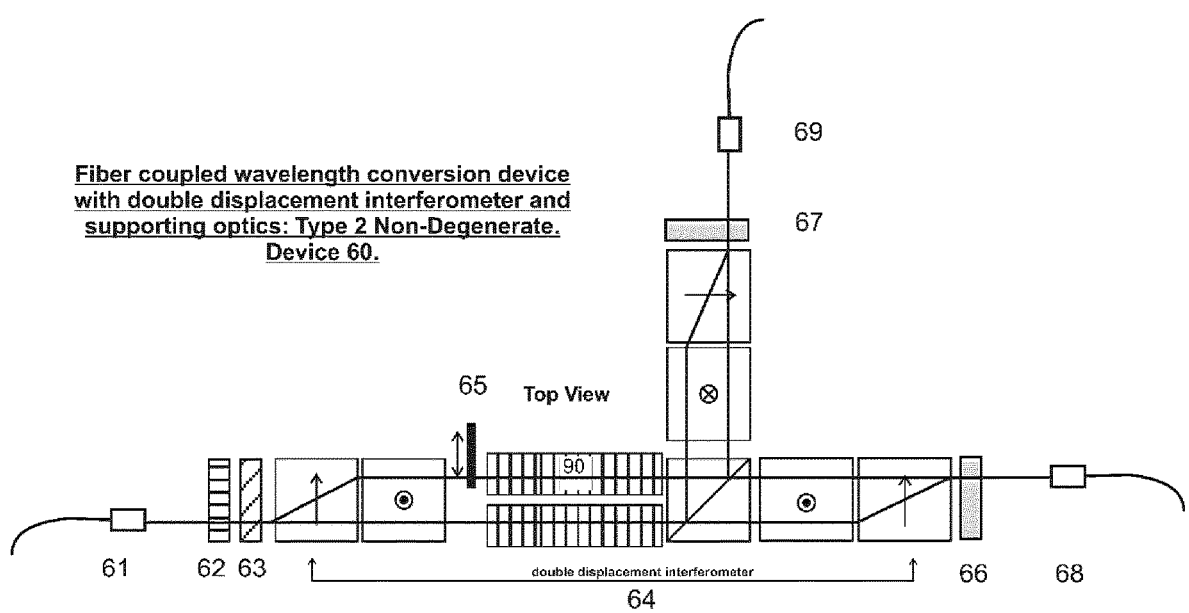

FIG. 13 describes the optical behaviour of the pump beam in the first stage common beam displacement configuration;

FIG. 14 describes the optical wavelength conversion process for the type 0, type 1, and type 2 phase matching scenarios;

FIG. 15 describes the optical behaviour of the third stage type 0 degenerate and non-degenerate configuration;

FIG. 16 describes the optical behaviour of the third stage type 1 degenerate and non-degenerate configuration;

FIG. 17 describes the optical behaviour of the third stage type 2 degenerate and non-degenerate configuration;

FIG. 18 depicts an embodiment of a double displacement interferometer incorporating down conversion crystals that support type-0 degenerate phase matching;

FIG. 19 depicts an embodiment of a double displacement interferometer incorporating down conversion crystals that support type-0 non-degenerate phase matching;

FIG. 20 depicts an embodiment of a double displacement interferometer incorporating down conversion crystals that support type-1 degenerate phase matching;

FIG. 21 depicts an embodiment of a double displacement interferometer incorporating down conversion crystals that support type-1 non-degenerate phase matching;

FIG. 22 depicts an embodiment of a double displacement interferometer incorporating down conversion crystals that support type-2 degenerate phase matching;

FIG. 23 depicts an embodiment of a double displacement interferometer incorporating down conversion crystals that support type-2 non-degenerate phase matching;

FIG. 24 shows an embodiment where a type 0 degenerate double displacement interferometer is incorporated into a fiber coupled device which includes supporting optics;

FIG. 25 shows an embodiment where a type 0 non-degenerate double displacement interferometer is incorporated into a fiber coupled device which includes supporting optics;

FIG. 26 shows an embodiment where a type 1 degenerate double displacement interferometer is incorporated into a fiber coupled device which includes supporting optics;

FIG. 27 shows an embodiment where a type-1 non-degenerate double displacement interferometer is incorporated into a fiber coupled device which includes supporting optics;

FIG. 28 shows an embodiment where a type 2 degenerate double displacement interferometer is incorporated into a fiber coupled device which includes supporting optics; and FIG. 29 shows an embodiment where a type 2 non-degenerate double displacement interferometer is incorporated into a fiber coupled device which includes supporting optics.

DETAILED DESCRIPTION

Most of the optical terms used in this disclosure are known by those skilled in the art of quantum optics and classical optics. Nonetheless, a few concepts will be highlighted for review as they will aid in the understanding of the disclosure.

Polarization: Light or photons are well modelled as electromagnetic waves. Polarization describes the direction of the electric component of the electromagnetic wave in space. The state of polarization of a photon or ray of light is typically written with respect to a reference frame or basis; the projections of the electric field onto this basis serve to quantify the state of light in the polarization degree of freedom. Adhering to standard quantum mechanical notation, information about the polarization of a photon in a pure state is contained in two complex co-efficients $\alpha$ and $\beta$, a relative phase angle $\phi$, and a parameter $\theta$, called the global phase angle. The global phase angle represents the concept that a second photon may have the same polarization, but could have originated at a different time, or from a different source, and may be globally out of phase with the first photon. The complete state of polarization is given the symbol $|\Psi\rangle$:

$$|\Psi\rangle = e^{i\theta}(\alpha|H\rangle + e^{i\phi}\beta|V\rangle)$$

Where $|H\rangle$ represents the 'H' basis state (a photon that is entirely H polarized), $|V\rangle$ represents the 'V' basis state (a photon that is entirely V polarized), $\alpha$ and $\beta$ represent the projections of the general state $|\Psi\rangle$ onto the horizontal and vertical basis states. Often, H refers to the horizontal direction, V refers to the vertical direction, and the symbol $\||\Psi\rangle|^2 = \langle\Psi|\Psi\rangle = 1$ for normalization. The tuple $(\alpha, \beta, \varphi)$ will be used in this document when the polarization basis ($|H\rangle$, $|V\rangle$) is understood.

Extra-ordinary and ordinary rays: Rays of light or photons whose electric field wavefront normal is parallel to their direction of propagation are called ordinary rays. Rays of light whose electric field wavefront normal is not parallel to the light direction of propagation are called extraordinary rays.

Spontaneous Parametric Down Conversion (SPDC): This disclosure deals with passive optical wavelength conversion techniques. One of the most common passive optical processes that accomplishes wavelength conversion is three wave mixing. One form of this process is called spontaneous parametric down conversion (SPDC). To help aid in the understanding of the disclosure a brief review of SPDC is warranted.

SPDC describes the process where a pump (p) photon is annihilated and where two photons called signal (s) and idler (i), are created. The pump photon has energy proportional to its frequency $\omega_p$ and momentum proportional to its wavevector $\vec{k}_p$. The signal and idler photons have energies and momenta proportional to $\omega_s$, $\vec{k}_s$, and $\omega_i$, $\vec{k}_i$ respectively.

If the signal and idler photons are identical in frequency or near to being identical in frequency, the SPDC process is called degenerate or near degenerate. In this case, $\omega_s, \omega_i \cong \omega_c$, where $\omega_c$ represents the degenerate center frequency, and where $\omega_c = \omega_p/2$. If the signal and idler photons are significantly distinct in energy, the SPDC process is non-degenerate. Wavelength Conversion Crystals/Down Conversion Crystals: The conversion rates of SPDC are enhanced by non-linear optical material, typically crystals, called down conversion crystals. Many down conversion crystals are non-cubic and have an inherent crystal orientation defined by the orientation of a major bond axis. How the photon electric field direction is oriented with respect to the crystal orientation factors into whether or not wavelength conversion can take place.

Conservation laws and Boundary Conditions in Non-linear optics: For SPDC, energy is conserved between the photons: $\omega_p = \omega_s + \omega_i$. Momentum conservation is called phase matching. When momentum is conserved between the photons, $\vec{k}_p = \vec{k}_s + \vec{k}_i$, where $|\vec{k}_j| = 2\pi/\lambda_j$, $j \in \{p, s, i\}$, $\lambda$ is the photon wavelength. Because of the interconnection between a photons speed, frequency and wavelength, phase matching implies that the speeds of all the photons participating in the wavelength conversion (signal, idler, pump) are equal; the waves thus remaining in phase.

Phase matching: As with most materials, down conversion crystals are frequency dispersive. Frequency dispersion prevents the speeds of waves of different frequencies (but otherwise similar in polarization, spatial mode, and direction) from being the same. This makes phase matching, and by extension wavelength conversion via three wave mixing, difficult to achieve under normal circumstances. To overcome this, optical birefringence can be exploited. Birefringence may allow, for example, a vertically polarized pump photon to travel at the same speed and direction as a horizontally polarized signal or idler photon. These waves of different polarization would then be phase matched, allowing for wavelength conversion to occur between them. There are a variety of classifications of phase matching which depend on the directions and polarizations of the photons involved in the conversion process and which are relevant to the disclosure herein. Finally, it is worth emphasizing that phase matching is inherently polarization dependent. This presents a challenge for building devices which accomplish wavelength conversion in a polarization independent manner.

Co-Linear and Non Co-Linear Phase Matching:

When the propagation direction of the pump differs from that of the signal and idler, the phase matching is called 'non co-linear'. When the pump, signal and idler all travel in the same direction, the phase matching is 'co-linear'.

Due to dispersion, co-linear phase matching is typically harder to achieve, but is desirable from an efficiency perspective. This is because the interaction region can be arbitrarily long. This disclosure is particularly well suited for co-linear phase matching.

Classifications of Phase Matching

Because phase matching is inherently dependent on the polarization of the pump, signal, and idler photons, it is often classified accordingly.

When the polarization of the pump photon is orthogonal to that of both the signal and idler photon, the process is called type-1 phase matching. Example: A horizontally polarized pump photon converts into vertically polarized signal and idler photons.

$$|H\rangle_p \rightarrow |V\rangle_s \otimes |V\rangle_i$$

The $\otimes$ symbol denotes a tensor product, which models that the two photons can be treated as separable (not entangled in polarization). When the polarization of the pump photon is orthogonal to one of the signal or idler photons, but parallel to the other, the process is called type-2 phase matching. Example: A horizontally polarized pump photon converts into a horizontally polarized signal photon and a vertically polarized idler photon.

$$|H\rangle_p \rightarrow |H\rangle_s \otimes |V\rangle_i$$

When the polarization of the pump photon is identical to that of both the signal and idler photon, the phase matching is called type-0. Example: A horizontally polarized pump photon converts into horizontally polarized signal and idler photons.

$$|H\rangle_p \rightarrow |H\rangle_s \otimes |H\rangle_i$$

Dispersion usually prevents type-0 phase matching. It is therefore most often accomplished through material engineering. In this case, the pump, signal and idler may not always be perfectly in phase, and the technique is called quasi-phase matching.

Optical Beam Displacers:

Beam displacers are a type of discrete optical component made from optically anisotropic crystals. Similar to down conversion crystals, crystal beam displacers have an inherent orientation usually defined by the orientation of a major bond axis. When oriented properly, optical beam displacers showcase the phenomenon of double refraction where an input ray of light incident on the displacer will decompose into ordinary and extra-ordinary light. The ordinary and extraordinary light are orthogonally polarized. Despite having parallel electric field wavefronts, the two rays refract differently and separate spatially from each other through a separation angle ε. The splitting of power into each ray depends on the extraordinary/ordinary decomposition of the initial light ray.

Optical beam displacers, are wavelength dispersive. The separation angle is a function of wavelength, $\varepsilon \rightarrow \varepsilon(\lambda)$. Thus, the separation angle induced by a displacer on pump light at a pump wavelength will not be the same as the separation angle induced by the same displacer on light that has been converted to the signal or idler wavelength. Consequently, pump, signal and idler photons which enter an optical beam displacer all travelling in the same direction, will travel along slightly different paths as they traverse the optical beam displacer and will emerge at different positions upon exiting the optical beam displacer.

Polarization-Entanglement:

This disclosure describes a device which transfers an arbitrary polarization state of a pump photon onto a pair of signal/idler photons (and vice versa). The process is modelled as follows:

$$e^{i\theta}(\alpha |H\rangle_p + e^{i\phi}\beta|V\rangle_p)_{input} \leftrightarrow e^{i\theta}(\alpha |HH\rangle_{s,i} + e^{i\phi}\beta|VV\rangle_{s,i})_{output}$$

The symbols $|HH\rangle_{s,i}$ and $|VV\rangle_{s,i}$ are short form for the tensor product, $|V\rangle_s \otimes |V\rangle_i$. The reversable arrow in the above expression conveys that a pump photon can convert into a pair of signal/idler photons and vice versa. The expression states that sometimes, the pair of signal and idler photons have the same horizontal component of polarization (quantified by the coefficient $\alpha$) and sometimes the pair of signal and idler photons have the same vertical component of polarization (quantified by the coefficient $\beta$). Importantly, they cannot be physically separated into individual photons with each photon retaining a complete copy of the information about the input state in terms of $\alpha$, $\beta$, and $\phi$. Instead, what the expression conveys is that the state of polarization of the input photon is transferred and becomes a property of the newly created pair of photons. This is also an example of polarization independent wavelength conversion. In the language of quantum mechanics, the photon pair is said to be entangled in the polarization degree of freedom.

Creating Maximal Polarization Entanglement:

If the same device is given a photon having a polarization consisting of equal proportions of H and V:

$$|\Psi\rangle_{input} = e^{i\theta}\left(\frac{1}{\sqrt{2}}|H\rangle_p + e^{i\phi}\frac{1}{\sqrt{2}}|V\rangle_p\right)_{input}$$

then we would expect the device to produce an output pair of photons according to:

$$|\Psi\rangle_{input} = e^{i\theta}\left(\frac{1}{\sqrt{2}}|H\rangle_p + e^{i\phi}\frac{1}{\sqrt{2}}|V\rangle_p\right)_{input} \leftrightarrow e^{i\theta}\left(\frac{1}{\sqrt{2}}|HH\rangle_{s,i} + e^{i\phi}\frac{1}{\sqrt{2}}|VV\rangle_{s,i}\right)_{output}$$

This final state to the right of the arrow is known as a maximally polarization entangled state.

Interferometers:

Interferometers play a key role in producing a quantum entangled state or effecting passive polarization independent wavelength conversion. This disclosure describes a novel method for building an optical interferometer of the Mach-Zehnder (MZ) type that is balanced for all three wavelengths. Therefore, a discussion of a Mach-Zehnder type interferometer will aid in understanding the disclosure.

In its basic form, an optical Mach-Zehnder interferometer is a component/device which spatially splits input light from one or two optical inputs, into two optical paths or arms, and which subsequently recombines the light back into one or two outputs. It is often passive and can be operated from input to output or output to input. Often the interferometer is fabricated such that the two arms are balanced. Balanced implies that the optical pathlengths of both arms are equal. Interferometers are often used in a sensing application. Light in one arm may interact with or sense a different environment than light in the other arm, unbalancing the interferometer. This results in a change in the constructive or destructive interference between the two arms at the interferometer output. This is typically measurable as an intensity change in one of the two optical outputs. Often, the light-environment interaction is quantified as a change in the effective path length of the light in the sensing arm.

Balanced Interferometers have also been used to accomplish passive wavelength conversion. This is because the interferometer can overcome the inherent polarization dependence of the passive conversion process and convert all polarization components of the input electric field. It does so as follows: Consider input light into an interferometer that splits the input into its two orthogonally polarized components via a polarizing beam splitter; each polarized component is subsequently directed into a separate arm of the interferometer where it undergoes passive wavelength conversion by a properly oriented non-linear material; the light is then recombined by a second polarizing beam splitter into an optical output. All polarization components get converted.

Figure 1:
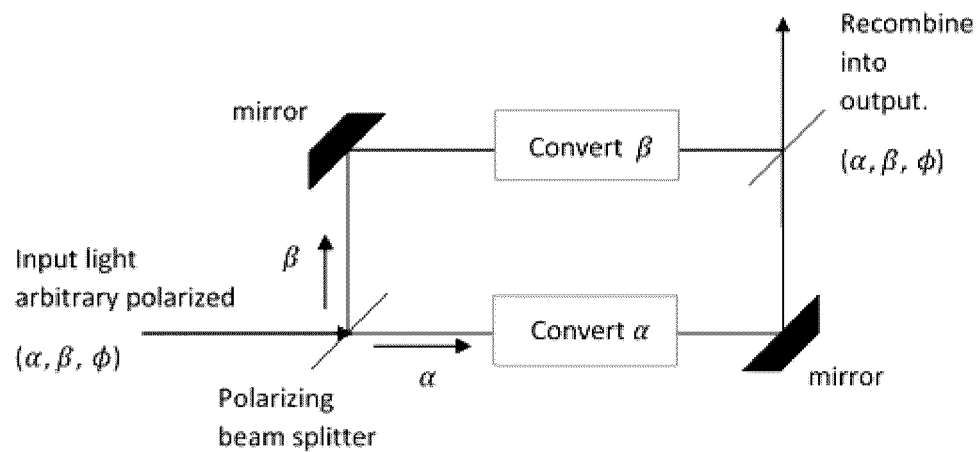
FIG. 1 is a schematic diagram of a Mach-Zehnder interferometer incorporating two down conversion crystals and demonstrating conceptually how to convert an input state of light into an output state of light in a polarization independent manner.

The configuration is shown in FIG. 1. From left to right, Input light with a polarization state defined by ($\alpha$, $\beta$, $\phi$) enters the Mach-Zehnder interferometer from the bottom left. One arm converts the $\alpha$ component, the other arm converts the $\beta$ component.

If the interferometer is optically balanced for both the pump and converted wavelengths, then the conversion process in the one arm occurs coherently with the conversion process in the other, the relative phase ($\phi$) present in the input being preserved in the recombined output. This coherence is desirable for polarization independent wavelength conversion and necessary for providing high quality polarization entanglement.

Because of the small size of optical wavelengths (nm), balancing the arms is challenging. Using discrete optical components typically requires precise and expensive positioning equipment with position feedback. On the other hand, integrated photonic designs suffer from expensive initial investment until the design can be finalized.

This disclosure describes a new wavelength conversion technique that employs discrete beam displacers but which does not require precise positioning equipment for balancing. Beam displacers have been identified as a useful method to build balanced Mach-Zehnder interferometers. However, when used in MZ interferometers employed as wavelength conversion devices, beam displacers have the added complication that they are wavelength dispersive: The displacement distance/angle of photons displaced at the input unconverted wavelength is not the same as the displacement distance/angle of photons displaced at the output converted wavelength. This effect can unbalance the interferometer.

This disclosure overcomes this particular challenge. This disclosure describes a technique for building a balanced Mach-Zehnder interferometer where the input half of the interferometer is balanced for the input wavelength and where the output half of the interferometer is balanced for the converted output wavelength. The technique is thus particularly well suited for building devices that can accomplish polarization independent wavelength conversion and or accomplish polarization entangled photon pairs.

Dispersion Induced Displacement Discrepancy:

This disclosure balances a Mach-Zehnder optical interferometer through the judicious use of multiple optical beam displacers. This new technique is required because existing beam displacer based MZ interferometers typically use identical beam displacer components to split and recombine the light. These existing methods do not account for the wavelength change between the input and output light and will result in either a dispersion induced phase discrepancy (DIPD) or a dispersion induced displacement discrepancy (DIDD) between the input and output light. That is, if the interferometer is completed (the optical paths completely recombine), the path lengths will differ (DIPD), conversely if the paths remain optically balanced, the interferometer is not fully completed (DIDD). One effect is the dual of the other. For the purposes of this disclosure, reference to the DIDD is predominantly used.

One way to overcome the DIDD is to make a judicious choice of optically anisotropic material where the dispersion of the displacer for the pump wavelength matches the dispersion of the displacer for the converted wavelengths. However, often, such a material cannot be found.

This disclosure focuses on overcoming the DIDD while maintaining nearly perfect phase coherence between the two recombining beams and while using the same displacer material. For the purposes of the disclosure, we define the DIDD as:

$$DIDD_{s/i} = L(\lambda_p) - L(\lambda_{s/i})$$

Figure 2:
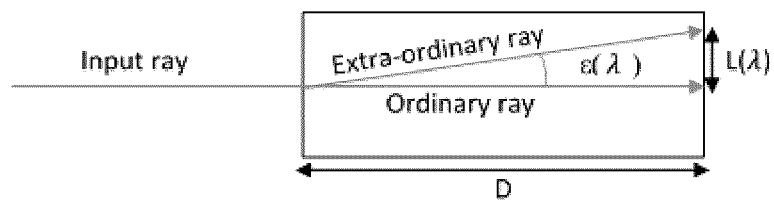
FIG. 2 is a schematic diagram of a beam displacing element or beam displacer displaying splitting effect on an input ray of light into an extraordinary and ordinary ray which subsequently separate over the length D of the displacer by a lateral distance L.

Here, $L = D \times \tan(\varepsilon)$, and represents the lateral distance moved by the optical beam; $D$ is the length of the displacer along the direction of propagation of the input beam; $\varepsilon$ is the angle between the extra-ordinary and ordinary ray. FIG. 2 depicts the relevant quantities. The novelty of the disclosure is to utilize orthogonally oriented pairs of displacers, placed judiciously in both the input and output sections of the MZ interferometer. The input pair of displacers causes equal displacements to occur in both the extraordinary and ordinary pump rays at the input stage (unconverted wavelength) while the output pair of displacers applies nominally equal displacements to both the extraordinary and ordinary converted rays at the output stage (converted wavelength). The effect is that light stays in phase as it splits, undergoes wavelength conversion, and recombines throughout the entire device, all while maintaining the DIDD at or very near zero.

The design is called a double displacement interferometer. By symmetrizing the displacement at both the input wavelength and output wavelengths, the arms of the double displacement interferometer remain nominally balanced for both the unconverted and converted light.

The motivation for this disclosure stems from the difficulties with optically balancing beam displacer based devices employed as wavelength conversion devices, and more specifically at overcoming the difficulties with building polarization independent wavelength conversion devices such as polarization entangled photon sources.

Beam displacer based designs of polarization entangled photon sources are often chosen because beam displacers afford good fixed control of optical delays while at the same time being capable of spatially separating light into two distinct paths. They are thus ideal for building and or manufacturing stable interferometers.

In beam displacer designs of polarization insensitive wavelength conversion devices or entangled photon pair producing devices, the interferometer is built as follows: There is an input beam displacement process, a wavelength conversion process, and a final output beam recombination process. Because of the wavelength conversion, the beam displacement process needs to be designed for the unconverted wavelength, while the beam recombination process needs to be designed for the converted wavelength. As these wavelengths are often quite disparate, a significant DIDD will arise between the input and output optical light if only a single displacer is used to accomplish either the displacement or the recombination. As mentioned in the introduction, conventional interferometer designs do not directly address the DIDD. This is because conventional interferometers were originally conceived of for only one wavelength. Therefore, the use of these conventional designs for wavelength conversion often requires complex adjustments to the pathlengths after the interferometer is built. Unfortunately, these adjustments are usually not permanent because the interferometer environment often changes (vibration/thermal) inducing small path length changes. Thus, regular tuning and manipulation of the path lengths in each arm becomes part of the necessary operation of the device.

As a result, there is a need for a double displacement interferometer configuration that overcomes dispersion induced phase and or displacement discrepancies in the prior art of beam displacer based polarization independent wavelength conversion devices. This disclosure describes a double beam displacement design concept. The double displacement design relaxes the dimensional tolerances of the individual displacers and greatly assists in balancing interferometers employed as wavelength conversion devices. The present disclosure may be referred to as a double displacement interferometer. Various embodiments of the present disclosure are directed at providing an optically phase stable interferometer out of discrete optical components wherein the interferometer arms contain crystals designed specifically for wavelength conversion. These embodiments facilitate the production of both high quality polarization entangled photon pairs and/or optical wavelength conversion of an input signal at one or more input wavelengths into an output signal at one or more output wavelengths in a polarization independent manner.

The specification of this disclosure is organized as follows:
1) Brief overview of the generalized physical and optical layout
2) Physical descriptions of the various configurations
3) Optical descriptions of the various configurations
4) Embodiments of the interferometer
5) Materials
6) Devices for each embodiment,
7) Generalized method of using the devices.

Note that the physical and optical descriptions given herein define configurations with a nominal input end and nominal output end. However, the optical direction can be reversed, the input becoming the output and vice versa. That is, the interferometer is reversible, and polarization independent optical wavelength conversion works equally well in the forward direction as in the reverse direction, the only difference being the input wavelength(s) become the output wavelength(s) and vice versa.

The general physical and optical layout is as follows: Each embodiment of the disclosure includes an input beam displacing section including a plurality of orthogonally oriented optical beam displacing elements; a wavelength conversion section including a plurality of orthogonally oriented non-linear optical wavelength converters; an output beam recombination section including a plurality of orthogonally oriented optical beam displacing elements.

Co-Ordinate System

Figure 3:
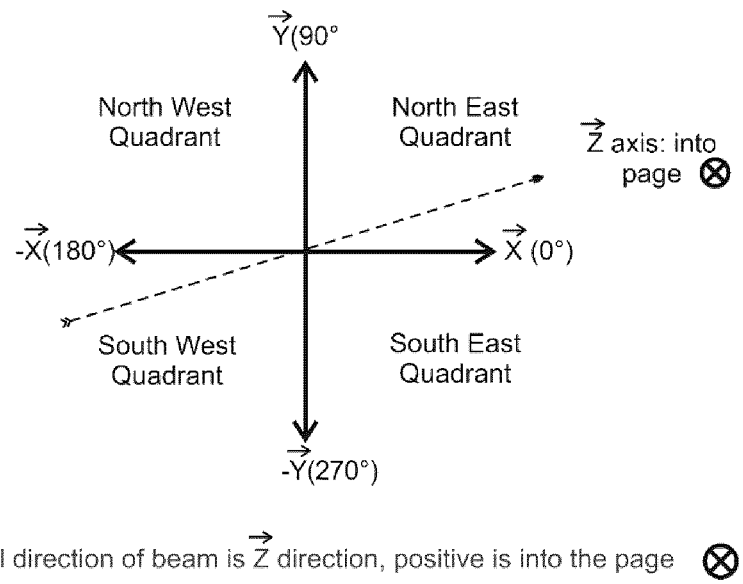
FIG. 3 depicts the reference co-ordinate system used throughout the disclosure to describe the transverse positions of the optical beams (pump, signal, idler) in terms of quadrants as they propagate through the various configurations. The co-ordinate system also references the orientations of the down conversion crystals and beam displacing elements.

To facilitate the understanding of the physical and optical descriptions below, a reference co-moving cartesian co-ordinate system is useful. The co-ordinate system is co-moving in the sense that the origin follows a generalized wavefront position of the optical beams as they propagate. $\vec{Z}$ defines the optical direction along which the beam propagates. $\vec{X}$ and $\vec{Y}$ are transverse directions. x, y are co-ordinates. In the co-moving frame, z=0. The $\vec{Z}$ axis, defined by =y=0, locates the transverse center position about which the various beams are referenced. The four quadrants, north-east, north west, south-east, and south-west define regions where the optical beams move transversely to and from as they propagate. Without loss of generality, the positive $\vec{X}$ axis is defined to be Horizontal and 0 degrees. The positive $\vec{Y}$ direction is defined to be Vertical making an angle of 90 degrees with respect to the $\vec{X}$ axis, the $-\vec{Y}$ direction makes an angle of 270 degrees with respect to the positive $+\vec{X}$ axis, the negative $-\vec{X}$ direction makes an angle of 180 degrees with respect to $+\vec{X}$ axis. Finally, the co-moving frame will move along with each beam in the interferometer. The co-ordinate system is shown in FIG. 3. A separate but similar co-ordinate system is used for the pump, signal and idler beams as required.

Symbology

Figure 4:
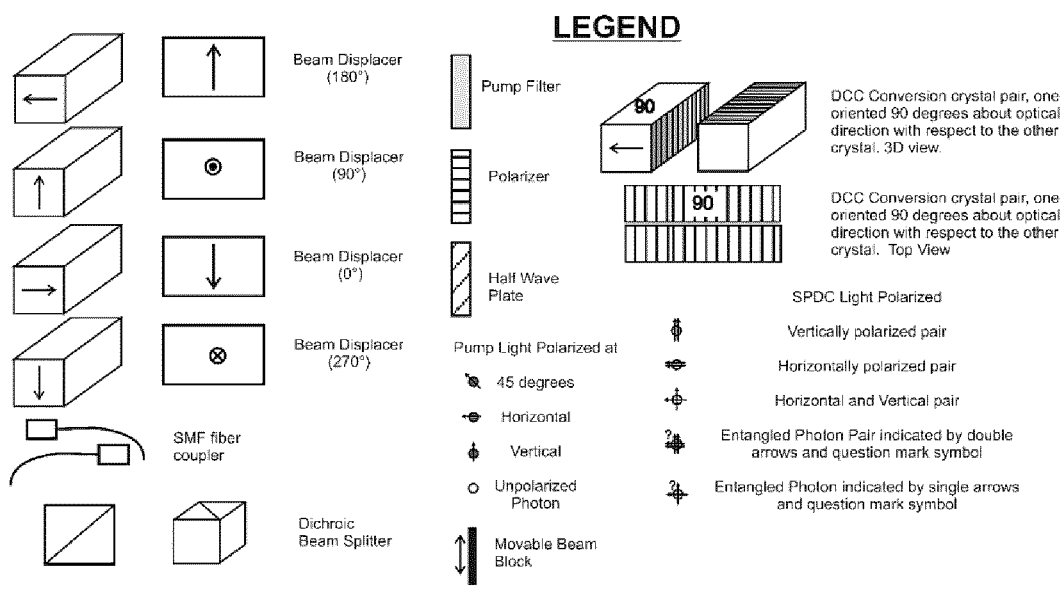
FIG. 4 is a legend which references the symbols used in the various figures of the disclosure.

FIG. 4 depicts the symbology used in the diagrams and figures of this disclosure and provides a brief description of what the symbols refer to:

Physical Descriptions

In the preferred embodiments, the double displacement interferometer facilitates wavelength conversion via either a type-0, type-1, or type-2 phase matched 3-wave mixing process. All three phase matching scenarios comprise of a common input beam displacement configuration, and a common wavelength conversion configuration. However, each phase matching scenario includes a unique beam recombination configuration. In addition, each phase matching scenario can be further sub classified as either wavelength degenerate or wavelength non-degenerate. Thus, there are six embodiments of the double displacement interferometer.

Figure 5:
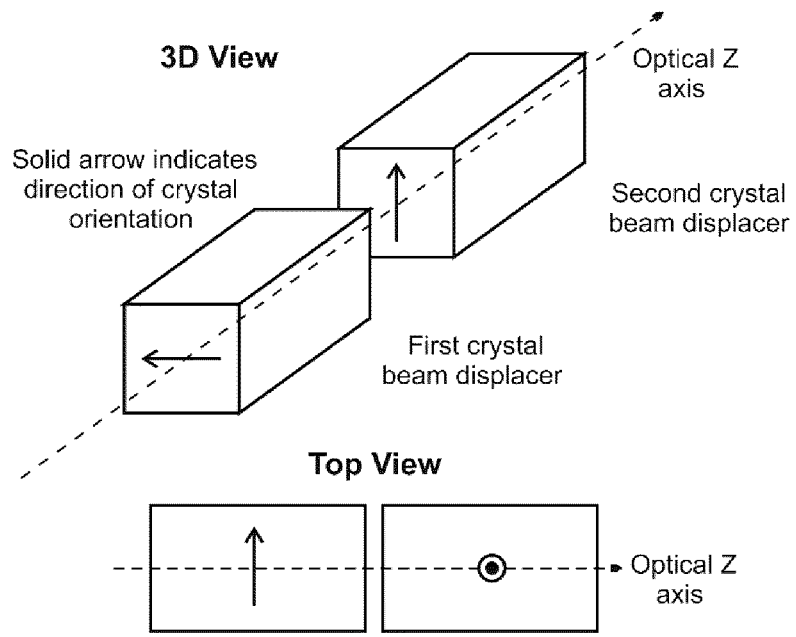
FIG. 5 shows the physical description of the first stage common beam displacement configuration.

The first stage input beam displacement configuration is common to all three phase matching scenarios and is common to configurations designed for both degenerate and non-degenerate wavelength conversion. It is depicted in FIG. 5. The first stage input beam displacement configuration includes:

1) a first and second beam displacer, optically identical to each other, preferably cut from the same material, preferably cut at the same angle, and preferably of the same length in the optical direction, placed in series along the optical direction, where the crystal orientation of the first beam displacer is defined as 180 degrees, and where the crystal orientation of the second beam displacer is 90 degrees. The orientation of the first beam displacer is thus orthogonal to the second beam displacer. The input and output facets of the first and second beam displacer do not necessarily need to be equal in area, but the area of extent of the input and output facets of both beam displacers should be sufficient as to accommodate the required optical beam displacements. A simple approach to satisfying this requirement is for the facets of both the first and second beam displacers to occupy significant portions of all four quadrants of the reference co-ordinate system. The beam displacers are drawn in the figure as parallelepipeds centered on the co-moving co-ordinate system.

Figure 6:
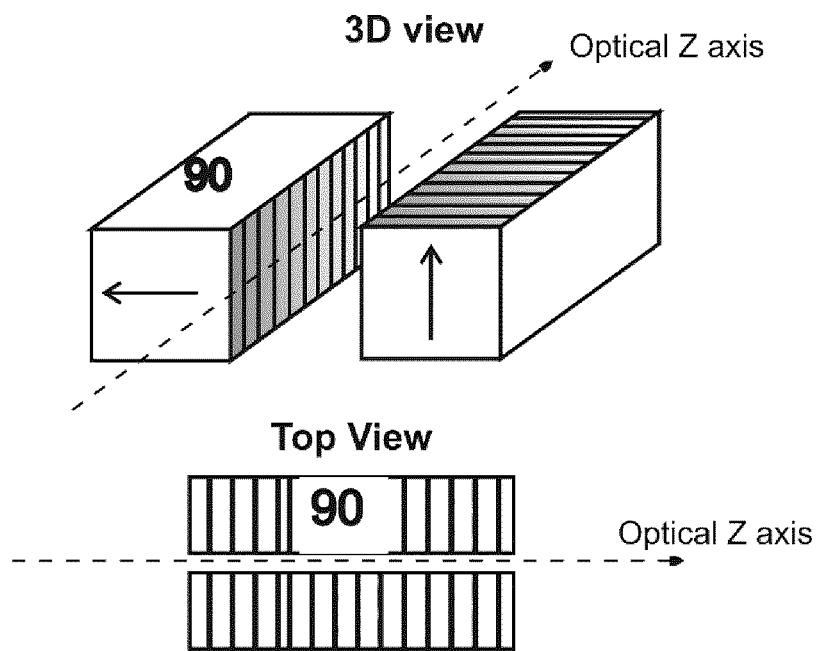
FIG. 6 shows the physical description of the second stage common wavelength conversion configuration.

The second stage wavelength conversion configuration is common to all three phase matching scenarios and is common to configurations designed for both degenerate and non-degenerate wavelength conversion. The second stage conversion configuration is shown in FIG. 6. The second stage wavelength conversion configuration includes:

2) first and second wavelength converters, both satisfying either type-0, type-1, or type-2 phase matching, optically identical to each other, the converters preferably made from the same material, and preferably of the same length in the optical direction, placed in parallel along the optical direction, the first wavelength converter having a crystal orientation that is orthogonal to the second wavelength converter, the pair of converters placed directly after (in series with, along the optical direction) the first stage input beam displacement configuration. The facets of the first and second wavelength converters do not necessarily need to be equal in area, but the input and output facets of each converter should be large enough so as to contain the appropriately polarized optical beam that is meant to undergo the process of wavelength conversion. The polarization to be determined by the phase matching conditions of the wavelength converter. Without loss of generality, the first wavelength converter will be transversely positioned to occupy at least the south-west quadrant, while the second wavelength converter will be transversely positioned to occupy at least the north-east quadrant.

The third stage output configuration. One of the functions of the third stage is to facilitate the recombination of the wavelength converted beams into one or more optical outputs, completing the interferometer. The third stage has three variants, one for each phase matching condition. Each variant is further classified according to whether the conversion is wavelength degenerate or wavelength non-degenerate. There is thus a total of six third stage output configurations.

Figure 7:
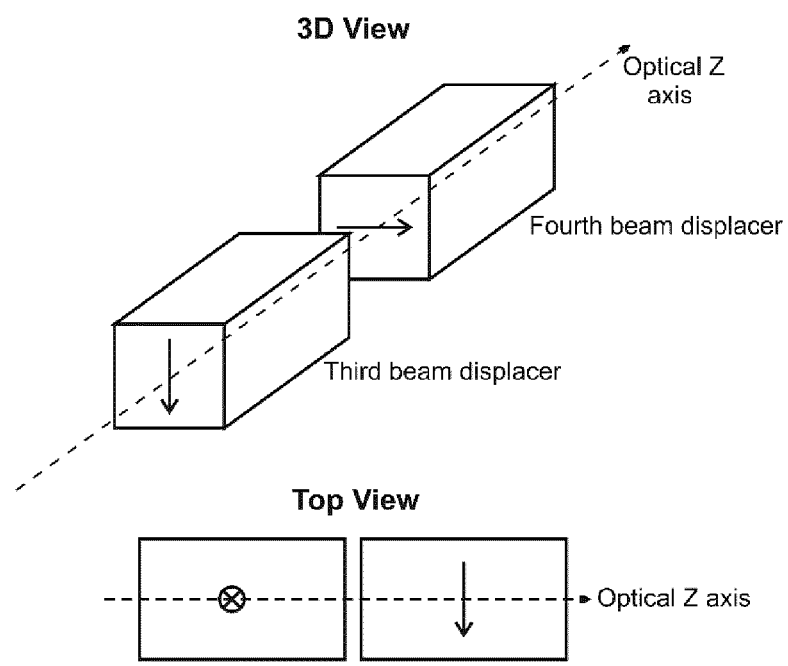
FIG. 7 shows the physical layout of the third stage type 0 degenerate configuration.

1) 3rd stage Degenerate Type-0: The degenerate type-0 variant is shown in FIG. 7. The configuration includes third and fourth beam displacers, optically identical to each other, preferably made from the same material, preferably cut at the same angle, and preferably of the same length in the optical direction, placed in series along the optical direction, the pair of displacers placed directly after (in series, along the optical direction) the second stage wavelength conversion configuration and where the crystal orientation of the third beam displacer is 270 degrees, and where the crystal orientation of the fourth beam displacer is 0 degrees. The input and output facets of the third and fourth beam displacers do not necessarily need to be equal in area, but the area of extent of the input and output facets of both beam displacers should be sufficient as to accommodate the required optical beam displacements to complete the interferometer. A simple approach to satisfying this requirement is for the facets of both the third and fourth displacer to occupy significant portions of all four quadrants.

Figure 8:
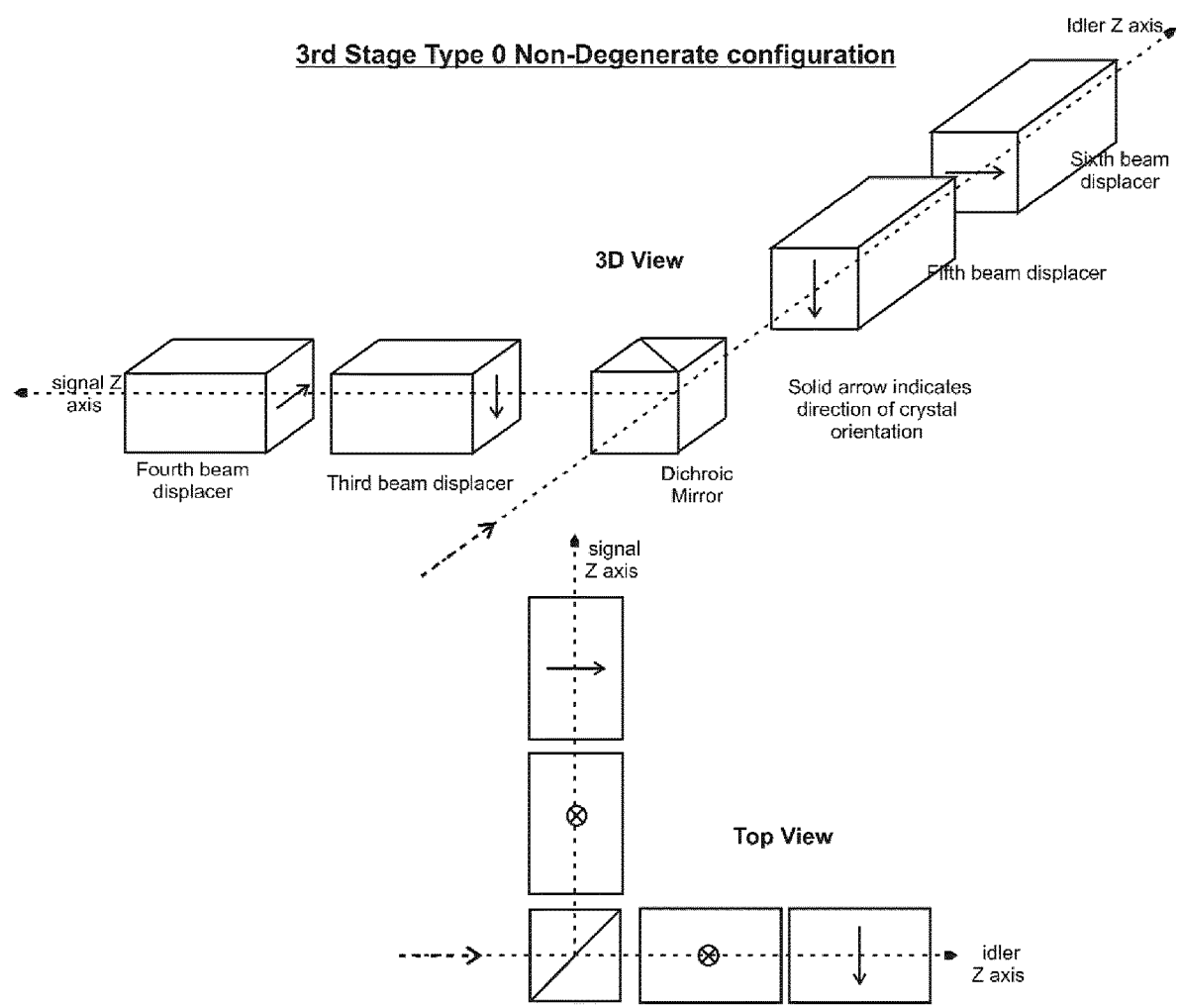
FIG. 8 shows the physical layout of the third stage type 0 non-degenerate configuration.

2) $3^{rd}$ stage Non-degenerate Type 0: The $3^{rd}$ stage non degenerate type-0 variant is shown in FIG. 8. It includes
   i. a first dichroic beam splitter, placed directly after (in series along the optical direction) the second stage wavelength conversion configuration. The dichroic should have an area of extent that is sufficient to redirect signal photons created in each down conversion crystal into a signal optical direction called the signal Z axis. The dichroic should also have an area of extent that is sufficient to redirect idler photons created in each down conversion crystal into an idler optical direction called the idler Z axis.
   ii. Following the first dichroic, along the signal Z axis, are third and fourth beam displacers, optically identical to each other, preferably made from the same material, preferably cut at the same angle, and preferably of the same length in the signal optical direction, placed in series along the signal optical direction, the pair of displacers placed directly after the dichroic beam splitter and where the crystal orientation of the third beam displacer is 270 degrees in the frame of reference co-moving in the signal optical direction, and where the crystal orientation of the fourth beam displacer is 0 degrees in the frame of reference co-moving in the signal optical direction. The input and output facets of the third and fourth beam displacers do not necessarily need to be equal in area, but the area of extent of the input and output facets of both third and fourth beam displacers should be sufficient as to accommodate the required optical beam displacements for the signal photons. A simple approach to satisfying this requirement is for the area of the facets of both the third and fourth displacers to occupy significant portions of all four quadrants.
   iii. Following the first dichroic, along the idler Z axis, are fifth and sixth beam displacers, optically identical to each other, preferably made from the same material, preferably cut at the same angle, and preferably of the same length in the idler optical direction, placed in series along the idler optical direction, the pair of displacers placed directly after the dichroic beam splitter and where the crystal orientation of the fifth beam displacer is 270 degrees in the frame of reference co-moving in the idler optical direction, and where the crystal orientation of the sixth beam displacer is 0 degrees in the frame of reference co-moving in the idler optical direction. The input and output facets of the fifth and sixth beam displacers do not necessarily need to be equal in area, but the area of extent of the input and output facets of both fifth and sixth beam displacers should be sufficient as to accommodate the required optical beam displacements for the idler photons. A simple approach to satisfying this requirement is for the area of the facets of both the fifth and sixth displacers to occupy significant portions of all four quadrants.

Figure 9:
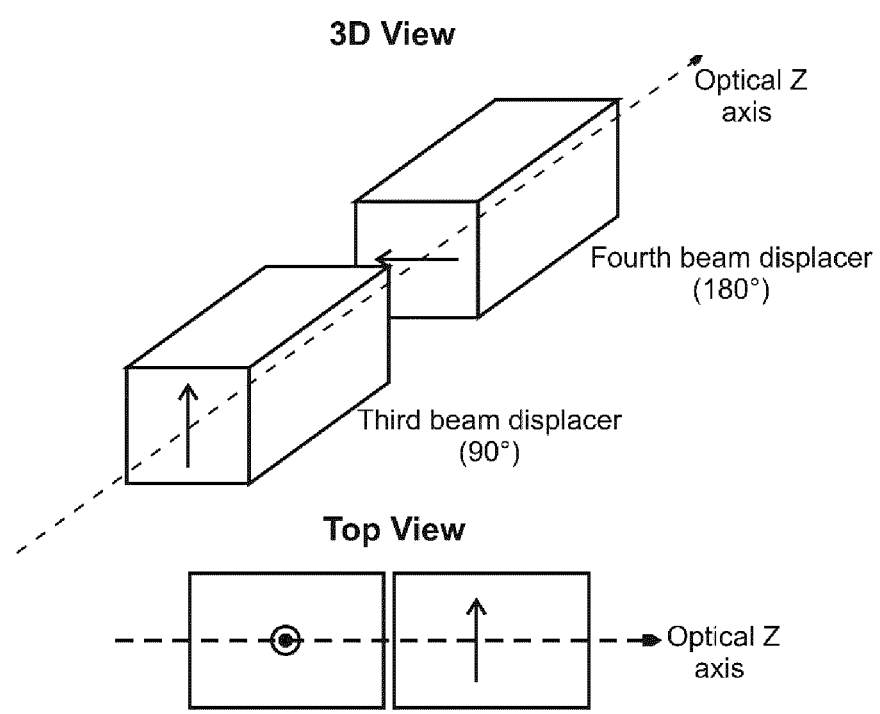
FIG. 9 shows the physical layout of the third stage type 1 degenerate configuration.
Figure 10:
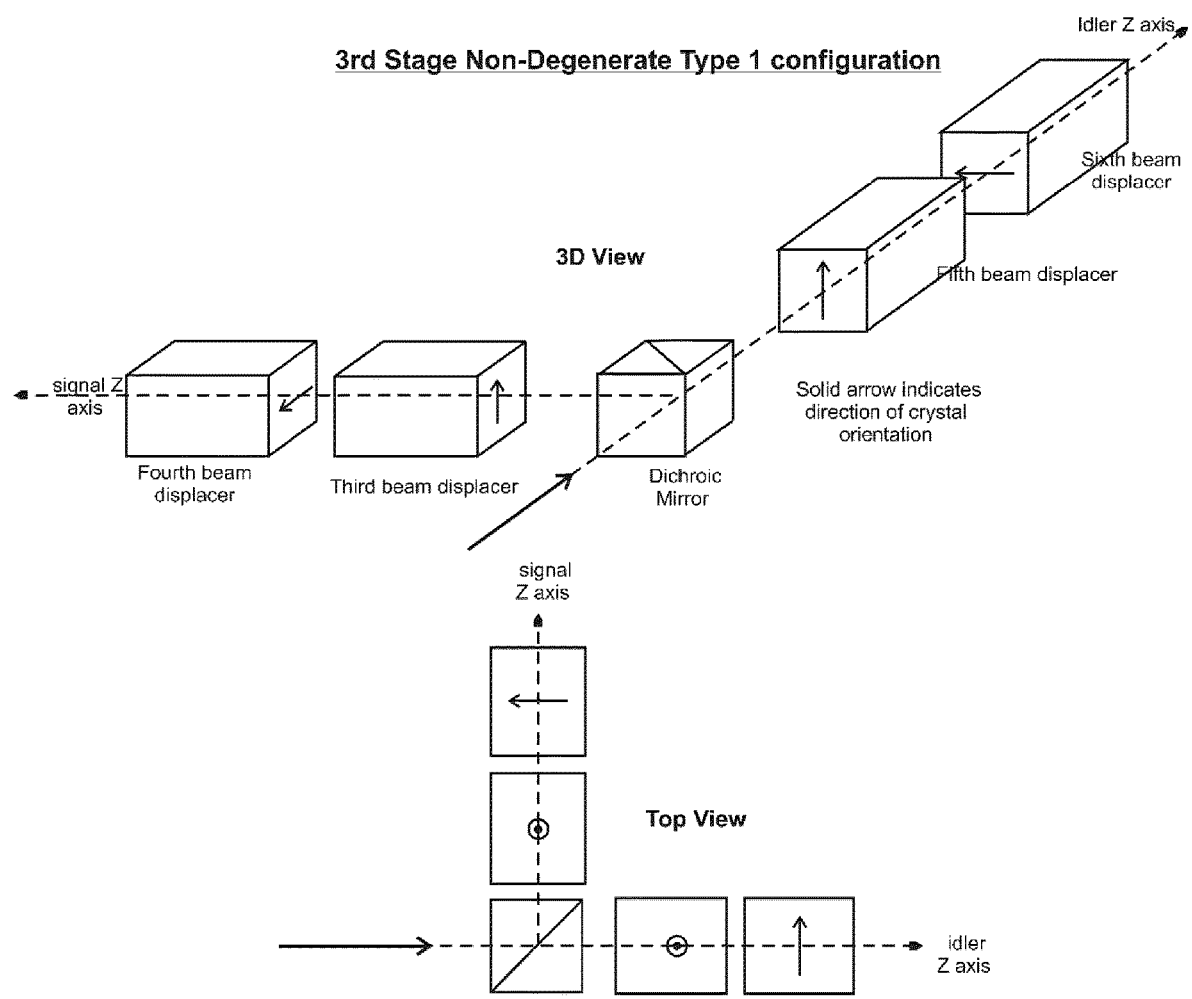
FIG. 10 shows the physical layout of the third stage type 1 non-degenerate configuration.
Figure 12:
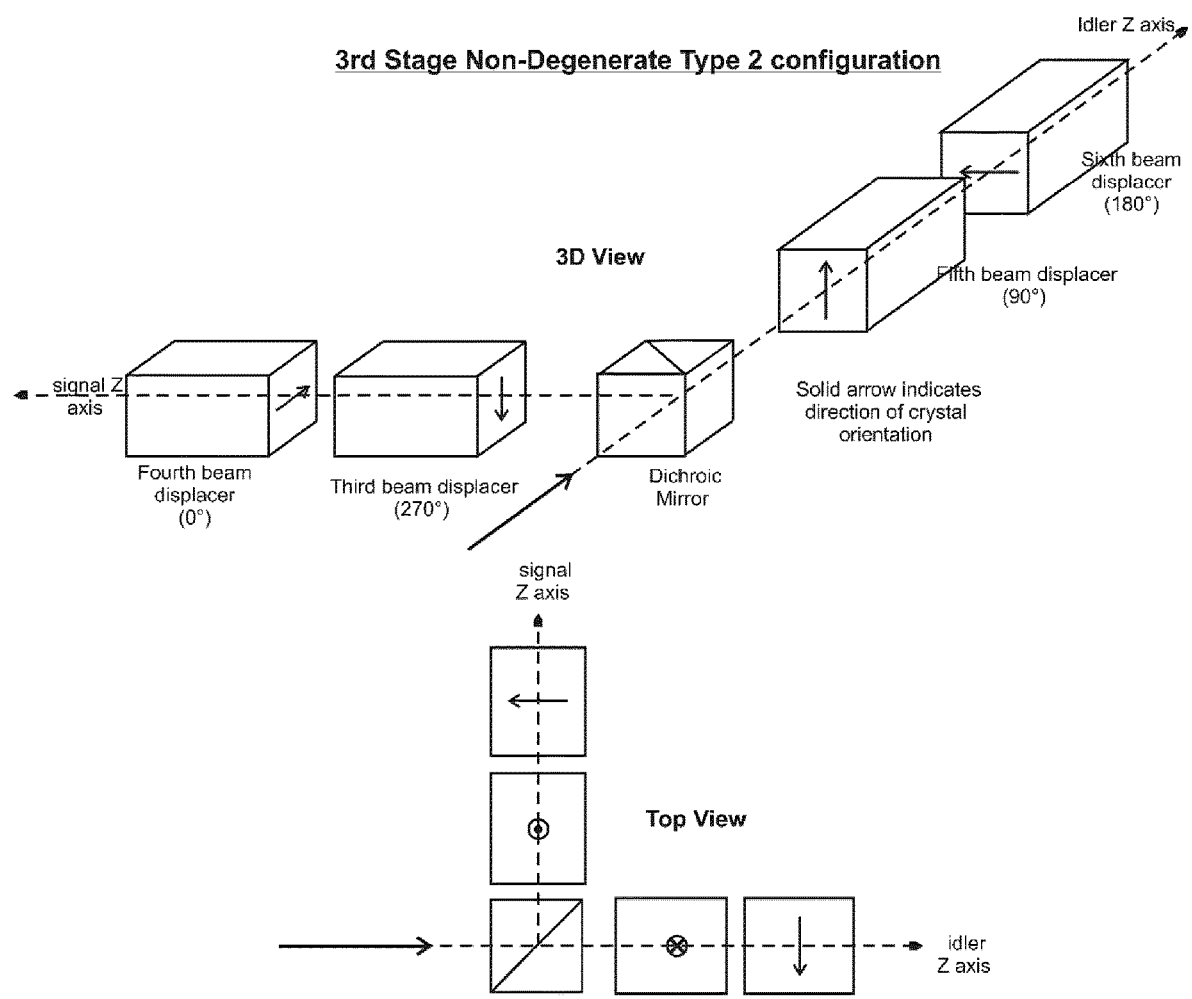
FIG. 12 shows the physical layout of the third stage type 1 non-degenerate configuration.

3) stage Degenerate Type-1: The $3^{rd}$ stage degenerate type 1 variant is shown in FIG. 9. It includes third and fourth beam displacers, optically identical to each other, preferably made from the same material, preferably cut at the same angle, and preferably of the same length in the optical direction, placed in series along the optical direction, the pair of displacers placed directly after (in series, along the optical direction) the second stage wavelength conversion configuration and where the crystal orientation of the third beam displacer is 90 degrees, and where the crystal orientation of the fourth beam displacer is 180 degrees. The input and output facets of the third and fourth beam displacer do not necessarily need to be equal in extent, but the facets of the displacers should be sufficient as to accomplish/accommodate the required optical beam displacement. A simple approach to satisfying this requirement is for the facets of both the third and fourth displacer to occupy significant portions of all four quadrants.

4) $3^{rd}$ stage Non-degenerate Type 1: The $3^{rd}$ stage non degenerate type-1 variant includes
   i. a first dichroic beam splitter, placed directly after (in series along the optical direction) the second stage wavelength conversion configuration. The first dichroic should have an area of extent that is sufficient to redirect signal photons created in each down conversion crystal into a signal optical direction called the signal Z axis. The first dichroic should have an area of extent that is sufficient to redirect idler photons created in each down conversion crystal into an idler optical direction called the idler Z axis.
   ii. Directly following the first dichroic, along the signal Z axis, are third and fourth beam displacers, optically identical to each other, preferably made from the same material, preferably cut at the same angle, and preferably of the same length in the signal optical direction, placed in series along the signal optical direction, the pair of displacers placed directly after the dichroic beam splitter and where the crystal orientation of the third beam displacer is 90 degrees in a reference frame co-moving in the signal optical direction, and where the crystal orientation of the fourth beam displacer is 180 degrees in a reference frame co-moving in the signal optical direction. The input and output facets of the third and fourth beam displacers do not necessarily need to be equal in area, but the area of extent of the input and output facets of both third and fourth beam displacers should be sufficient as to accommodate the required optical beam displacements for the signal photons. A simple approach to satisfying this requirement is for the area of the facets of both the third and fourth displacers to occupy significant portions of all four quadrants.

iii. Directly following the first dichroic, along the idler Z axis, are fifth and sixth beam displacers, optically identical to each other, preferably made from the same material, preferably cut at the same angle, and preferably of the same length in the idler optical direction, placed in series along the idler optical direction, the pair of displacers placed directly after the dichroic beam splitter and where the crystal orientation of the fifth beam displacer is 90 degrees in a reference frame co-moving in the idler optical direction, and where the crystal orientation of the sixth beam displacer is 180 degrees in a reference frame co-moving in the idler optical direction. The input and output facets of the fifth and sixth beam displacers do not necessarily need to be equal in area, but the area of extent of the input and output facets of both fifth and sixth beam displacers should be sufficient as to accommodate the required optical beam displacements for the idler photons. A simple approach to satisfying this requirement is for the area of the facets of both the fifth and sixth displacers to occupy significant portions of all four quadrants.

5) $3^{rd}$ Stage Degenerate Type-2:
   a. For the degenerate type-2, the recombination section includes:
      i. Third and fourth beam displacers, optically identical to each other, preferably made from the same material, preferably cut at the same angle, and preferably of the same length in the optical direction, placed in parallel along the optical direction, and placed directly after (in series, along the optical direction) the second stage wavelength conversion configuration, where the crystal orientation of the third beam displacer is oriented at 90 degrees in a reference frame co-moving in the optical direction, and where the crystal orientation of the fourth beam displacer is oriented at 270 degrees in a reference frame co-moving in the optical direction. The area of extent of the facet of the third beam displacer should be sufficient to accommodate the required displacement for one of the two optically converted beams; the area of extent of the facet of the fourth beam displacer should be sufficient to accommodate the required displacement for the other of the two optically converted beams. A simple approach to satisfying this requirement is for the area of extent of the facet of the third beam displacer to occupy the north west and south west quadrant (left), and for the area of extent of the facet of the fourth beam displacer to occupy the north east and south east quadrant (right)
      ii. Fifth and sixth beam displacers, optically identical to each other, preferably made from the same material, preferably cut at the same angle, and preferably of the same length in the optical direction, placed in parallel (to each other) along the optical direction, the pair of displacers placed directly after (in series, along the optical direction) the third and fourth beam displacers, where the crystal orientation of the fifth beam displacer is oriented at 0 degrees in a reference frame co-moving in the optical direction, and where the crystal orientation of the sixth beam displacer is oriented at 180 degrees in a reference frame co-moving in the optical direction. In the configuration just described, the area of extent of the facet of the fifth beam displacer should occupy at least the south east and south west quadrant (bottom), and the area of extent of the facet of the sixth beam displacer should occupy at least the north east and north west quadrant (top).

6) $3^{rd}$ stage non-degenerate type-2:
   a. For the type-2 non-degenerate variant, the recombination section includes:
      i. A first dichroic beam splitter, placed directly after (in series along the optical direction) the second stage wavelength conversion configuration. The first dichroic should have an area of extent that is sufficient to redirect signal photons created in each down conversion crystal into a signal optical direction called the signal Z axis. The first dichroic should have an area of extent that is sufficient to redirect idler photons created in each down conversion crystal into an idler optical direction called the idler Z axis.
      ii. Directly following the dichroic, along the signal Z axis, are third and fourth beam displacers, optically identical to each other, preferably made from the same material, preferably cut at the same angle, and preferably of the same length in the signal optical direction, placed in series along the signal optical direction, the pair of displacers placed directly after the dichroic beam splitter and where the crystal orientation of the third beam displacer is 90 degrees in a reference frame co-moving in the signal optical direction, and where the crystal orientation of the fourth beam displacer is 180 degrees in a reference frame co-moving in the signal optical direction. The input and output facets of the third and fourth beam displacers do not necessarily need to be equal in area, but the area of extent of the input and output facets of both the third and fourth beam displacers should be sufficient as to accommodate the required optical beam displacements for the signal photons. A simple approach to satisfying this requirement is for the area of the facets of both the third and fourth displacers to occupy significant portions of all four quadrants.
      iii. Directly following the dichroic, along the idler Z axis, are fifth and sixth beam displacers, optically identical to each other, preferably made from the same material, preferably cut at the same angle, and preferably of the same length in the idler optical direction, placed in series along the idler optical direction, the pair of displacers placed directly after the dichroic beam splitter and where the crystal orientation of the fifth beam displacer is 270 degrees in a reference frame co-moving in the idler optical direction, and where the crystal orientation of the sixth beam displacer is 0 degrees in a reference frame co-moving in the idler optical direction. The input and output facets of the fifth and sixth beam displacers do not necessarily need to be equal in area, but the area of extent of the input and output facets of both fifth and sixth beam displacers should be sufficient as to accommodate the required optical beam displacements for the idler photons. A simple approach to satisfying this requirement is for the area of the facets of both the fifth and sixth displacers to occupy significant portions of all four quadrants.

These physical embodiments are the heart of the design and sufficiently cover the various types of three wave mixing phase matching scenarios.

It should be noted that the order of the placement of the input or output stage beam displacers is not a design requirement. For example, the first stage input beam displacement configuration might be configured to have the 90 degree oriented beam displacer as the first input beam displacer and the 180 degree oriented beam displacer as the second input beam displacer. The same principle applies to the third stage output beam displacement configuration where the ordering of any pair of recombination displacers (for displacing the signal photons, the idler photons or both) may be reconfigured. Whatever their arrangement, the displacer pairs are chosen (material, cut angle, orientation and dimensions) in order to symmetrically displace and recombine the optical beams by the appropriate amounts so as to build a balanced Mach-Zehnder interferometer for more than one optical wavelength.

Optical Description:

A description of the optical operation of the various physical embodiments is given below. Though it is not necessary, it will be assumed that both crystals in the interferometer will have identical phase matching conditions and similar efficiencies. In addition, though it is not necessary, the input light will be assumed to be diagonally polarized (D) at 45 degrees with respect to the defined co-ordinate system. In this case, approximately half of the beam will be displaced horizontally and the other half of the beam will be displaced vertically. The scenario just described will provide for the creation of maximally polarization entangled photons. For the special circumstance where it is desirable to create maximally polarization entangled photons, deviations from the input beam having diagonally polarized input light, or the two down conversion crystals having identical phase matching, or differing conversion efficiencies, will be discussed below.

Without loss of generality, the displacement action of the displacers will follow a general rule which is to laterally displace polarized light that is aligned with the displacer crystal orientation. Further, the direction of the lateral displacement will also be in the direction defined by the crystal orientation of the displacer. For example, a displacer whose crystal orientation is oriented 90 degrees will displace vertically polarized light in the positive $\vec{Y}$ direction.

Optical Behaviour of the First Stage Common Input Beam Displacement Configuration:

One of the functions of the first stage common beam displacement configuration is to split pump photons from a single pump beam into two spatially separated pump beams that are phase coherent along the optical direction. Each spatially separated pump beam will then enter the second stage wavelength conversion configuration at the same time. Under the assumption that the input pump light entering the first stage common input beam displacement configuration is diagonally polarized, the pump beam will split into two pump beams of approximately equal intensity. The optical behaviour is described below and is aided by FIG. 13 showing a sectional view of the configuration and indicates the positions of the various beams. Diagonally polarized pump light at frequency $\omega_p$ enters the input beam displacement configuration at a position somewhere in the south east quadrant of the first beam displacer. The first beam displacer, oriented at 180 degrees, projects approximately half of the pump light onto the H polarized state of light (the H polarized input beam) and half of the pump light onto the V polarized state of light (the V polarized input beam). The action of the first beam displacer displaces the H polarized pump beam by a distance L in the horizontal direction into the south west quadrant, leaving the remaining V polarized pump beam un-displaced such that two orthogonally polarized pump beams of roughly equal intensity, emerge at the output of the first beam displacer spatially separated by a transverse distance L. The second beam displacer, oriented at 90 degrees displaces the V polarized pump beam by a distance L in the vertical direction into the north east quadrant, leaving the H polarized pump beam undisturbed in the south west quadrant. As a result of the two displacements, the two orthogonally polarized pump beams are now separated diagonally by a distance of $\sqrt{2}L$, the V polarized portion of the pump beam located in the north east quadrant, the H polarized portion of the pump beam located in the south west quadrant. As the displacements are nominally equal, the two pump beams are very nearly precisely in phase along the optical direction as they enter their respective non-linear crystal in the second stage wavelength conversion configuration. Achieving this phase coherence by the simple addition of a $2^{nd}$ beam displacer that is optically identical to the first (only rotated 90 degrees) is one of the advantages of the disclosure.

Optical Behaviour of the Second Stage Wavelength Conversion Configuration:

Adhering to the phase matching design constraints imposed by the source design (Eg. type-0, type-1, type-2), a pair of identical and correctly phase matched down conversion crystals are placed in the path of each of the two pump beams. To aid in the understanding, the phase matching scenarios are depicted in FIG. 14. The conversion crystals are shown as dotted lines for reference. The three scenarios are described as follows:

a. Type-0: The H polarized pump beam in the south west quadrant produces H polarized wavelength converted signal and idler photons; The V polarized pump beam in the north east quadrant produces V polarized wavelength converted signal and idler photons.
   b. Type-1: The H polarized pump beam in the south west quadrant produces V polarized wavelength converted signal and idler photons; The V polarized pump beam in the north east quadrant produces H polarized wavelength converted signal and idler photons.
   c. Type-2: The H polarized pump beam in the south west quadrant produces both H and V polarized wavelength converted signa and ilder photons; The V polarized pump beam in the north east quadrant produces both V and H polarized wavelength converted signal and idler photons.

Optical Behaviour of the Third Stage Output Beam Displacement Configuration:

Upon exiting the crystals, converted signal and idler photon pairs and unconverted pump light enter the third stage beam displacement configuration. One of the functions of the third stage beam displacement configuration is to optimally combine together (spatially and coherently) the signal photons that were created during the second stage wavelength conversion configuration and to optimally combine together (spatially and coherently) the idler photons created in the second stage wavelength conversion configuration.

There are six variations of the third stage, two for each phase matching scenario. FIGS. 15,16,17 depict the symbols used to describe in detail the optical beam movement for the six different configurations.

1) Type 0—Degenerate: In the degenerate case, the signal and idler photons produced by each crystal have approximately the same spectra centered about a down converted output center wavelength, $\lambda_c$. The third displacer is oriented such that its action is to displace all V polarized photons (pump, signal and idler) in the opposing direction to which the initial V polarized component of the pump beam was displaced by the action of the second beam displacer. The third displacer will displace the degenerate signal/idler light by a distance L in magnitude. Thus, after traversing the third displacer, all vertically polarized pump, signal, and idler photons will be located in the south east quadrant, however, due to the DIDD, only the signal and idler will nominally be in the same transverse position as that of the initial pump beam. Similarly, the fourth displacer is oriented such that its action is to displace all H polarized photons (pump, signal, idler) in the opposing direction to which the initial H polarized pump beam was displaced by the action of the first beam displacer. The fourth displacer will displace the degenerate signal/idler light by a distance L in magnitude. Thus, after traversing the fourth displacer, all H polarized pump, signal and idler photons will be located back in the south east quadrant, however, due to the DIDD, only the signal and idler will nominally be in the same transverse position as that of the initial pump beam.

2) Type 0—Non-Degenerate: One of the differences between degenerate and non-degenerate wavelength conversion is the presence of a dichroic optic placed directly after the second stage wavelength conversion configuration. The dichroic is large enough to accept the exiting wavelength converted pump, signal and idler beams from each crystal. Without loss of generality, the optical action of the dichroic is to reflect both of the idler beams into an idler Z optical direction, and to transmit both of the signal beams, into a signal Z optical direction.

The idler Z direction defines an idler optical direction with the same north, south, east, and west designation defining quadrants for the position of the idler beams produced by each crystal. Similarly, the signal Z direction defines a signal optical direction with the same north, south, east, and west designation defining quadrants for the position of the signal beams produced by each crystal. The co-moving co-ordinate system applies to these new directions.

Following the dichroic, along the signal Z direction is a third beam displacer oriented such that its optical action is to displace all V polarized signal photons from the north east signal quadrant into the south east signal quadrant by a distance L in magnitude. Following the third beam displacer, along the signal Z direction is a fourth beam displacer oriented such that its optical action is to displace all H polarized signal photons from the South west signal quadrant into the south east signal quadrant by a distance L in magnitude.

Following the dichroic, along the idler Z direction is a fifth beam displacer oriented such that its optical action is to displace all V polarized idler photons from the north east idler quadrant into the south east idler quadrant by a distance L in magnitude. Following the fifth beam displacer, along the idler Z direction is a sixth beam displacer oriented such that its optical action is to displace all H polarized idler photons from the South west idler quadrant into the south east idler quadrant by a distance L in magnitude.

3) Type 1—Degenerate: In the degenerate case, the signal and idler photons produced by each crystal have approximately the same spectra centered about a down converted output center wavelength, $\lambda_c$.

The third displacer is oriented such that its action is to displace all V polarized photons (pump, signal and idler) in the same direction as the initial V polarized component of the pump beam was displaced by the action of the second beam displacer. The magnitude of the displacement is nominally equal to L. Thus, after traversing the third displacer, all vertically polarized signal, and idler photons will be located in the north west quadrant.

Similarly, the fourth displacer is oriented such that its action is to displace all H polarized photons (pump, signal, idler) in the same direction as the initial H polarized pump beam was displaced by the action of the first beam displacer. The magnitude of the displacement is nominally equal to L. Thus, after traversing the fourth displacer, all H polarized signal and idler photons will be located in the north west quadrant.

4) Type 1—Non-Degenerate: One of the differences between degenerate and non-degenerate wavelength conversion is the presence of a dichroic optic placed directly after the second stage wavelength conversion configuration. The dichroic is large enough to accept the exiting wavelength converted pump, signal and idler beams from each crystal. Without loss of generality, the optical action of the dichroic is to reflect both of the idler beams into an idler Z optical direction, and to transmit both of the signal beams, into a signal Z optical direction.

As with the type 0 case, the idler Z direction defines an idler optical direction with the same north, south, east, and west designations defining quadrants for the position of the idler beams produced by each crystal. Similarly, the signal Z direction defines a signal optical direction with the same north, south, east, and west designations defining quadrants for the position of the signal beams produced by each crystal. The co-moving co-ordinate system applies to these new optical directions.

Following the dichroic, along the signal Z direction is a third beam displacer oriented such that its optical action is to displace all V polarized signal photons from the south west signal quadrant into the north west signal quadrant by a distance L in magnitude. Following the third beam displacer, along the signal Z direction is a fourth beam displacer oriented such that its optical action is to displace all H polarized signal photons from the north east signal quadrant into the north west signal quadrant by a distance L in magnitude.

Following the dichroic, along the idler Z direction is a fifth beam displacer oriented such that its optical action is to displace all V polarized idler photons from the south west idler quadrant into the north west idler quadrant by a distance L in magnitude. Following the fifth beam displacer, along the idler Z direction is a sixth beam displacer oriented such that its optical action is to displace all H polarized idler photons from the north east idler quadrant into the north west idler quadrant by a distance L in magnitude.

5) Type 2: Degenerate: In the degenerate case, the signal and idler photons produced by each crystal have approximately the same spectra centered about a down converted output center wavelength, $\lambda_c$. We will assume, without loss of generality, that the signal photons in the southwest quadrant are H polarized (the idler photons produced in the southwest quadrant are V polarized). Because the conversion crystals of the second stage wavelength conversion configuration are assumed to be identical (phase matching and efficiency), but rotated 90 degrees about the optical direction with respect to each other, this implies that the signal photons in the northeast quadrant are V polarized (the idler photons produced in the northeast quadrant are H polarized).

In this scenario, the third displacer is oriented such that its action is to displace the V polarized idler photons from the south west quadrant into the north west quadrant by a distance L in magnitude, while the fourth displacer is oriented such that its action is to displace the V polarized signal photons from the north east quadrant into the south east quadrant by a distance L in magnitude. The third displacer area of extent covers the two western quadrants, while the fourth displacer area of extent covers the two eastern quadrants. The third and fourth beam displacers are in parallel. The third beam displacer is 'beside' the fourth beam displacer.

The fifth displacer is oriented such that its optical action is to displace the H polarized signal photons from the southwest quadrant into the southeast quadrant by a distance L in magnitude, while the sixth displacer is oriented such that its optical action is to displace the H polarized idler photons from the northeast quadrant into the north west quadrant by a distance L in magnitude. The fifth displacer area of extent covers the two southern quadrants, while the sixth displacer area of extent covers the two northern quadrants. The fifth and sixth beam displacers are in parallel. The sixth displacer is 'on top' of the sixth displacer.

6) Type 2: Non-Degenerate: Without loss of generality, it will be assumed that the signal photons in the southwest quadrant are H polarized (the idler photons produced in the southwest quadrant are V polarized) while the signal photons in the northeast quadrant are V polarized (the idler photons produced in the northeast quadrant are H polarized).

One of the differences between degenerate and non-degenerate wavelength conversion is the presence of a dichroic optic placed directly after the second stage wavelength conversion configuration. The dichroic is large enough to accept the exiting wavelength converted pump, signal and idler beams from each crystal. Without loss of generality, the optical action of the dichroic is to reflect both of the signal beams into a signal Z optical direction, and to transmit both of the idler beams, into an idler Z optical direction.

The idler Z direction defines an idler optical direction with north, south, east, and west designations defining quadrants for the position of the idler beams produced by each crystal. The signal Z direction defines a signal optical direction with north, south, east, and west designations defining quadrants for the position of the signal beams produced by each crystal. The co-moving co-ordinate system applies to these new optical directions.

Following the dichroic, along the signal Z direction is a third beam displacer oriented such that its optical action is to displace all V polarized signal photons from the north east signal quadrant into the south east signal quadrant by a distance L in magnitude. Following the third beam displacer, along the signal Z direction is a fourth beam displacer oriented such that its optical action is to displace all H polarized signal photons from the south west signal quadrant into the south east signal quadrant by a distance L in magnitude.

Following the dichroic, along the idler Z direction is a fifth beam displacer oriented such that its optical action is to displace all V polarized idler photons from the south west idler quadrant into the north west idler quadrant by a distance L in magnitude. Following the fifth beam displacer, along the idler Z direction is a sixth beam displacer oriented such that its optical action is to displace all H polarized idler photons from the north east idler quadrant into the north west idler quadrant by a distance L in magnitude.

To overcome the DIDD between the pump, signal and idler wavelengths, it is preferable to achieve as much spatial overlap as possible in the recombining beams at the output(s) of the six configurations. In a preferred embodiment, to achieve this, the magnitude of the lateral displacement of both the signal and idler beams that occur in the $3^{rd}$ stage output beam displacement configuration should be equal and opposite to the magnitude of the lateral displacement of the pump beam that occurs in the $1^{st}$ stage input beam displacement configuration. The magnitude of the required displacement is L. Because L is a function of wavelength (refer to FIG. 2), to achieve the required displacement, the dispersion induced displacement discrepancy between the center wavelength of the pump and the center wavelength of the signal and the center wavelength of the idler needs to be accounted for. As such, the dimensions of the displacers in the $3^{rd}$ stage output beam displacement configuration along the optical direction—represented by D in FIG. 2—will differ from the dimensions of the displacers in the $1^{st}$ stage input beam displacement configuration along the optical direction. This dimensional difference will be preferably that which is needed to ensure that all lateral displacements undergone by the pump, signal and idler beams are nominally identical and equal to the design displacement L.

Embodiments of the Double Displacement Interferometer

There are six embodiments of the double displacement interferometer. They are shown diagrammatically in FIG. 18, 19, 20, 21, 22, 23.

FIG. 18, Type 0 Degenerate: Diagonally (D) polarized pump light enters the first beam displacer 1 in the south-east quadrant. The horizontally (H) polarized pump component displaces to the south-west quadrant 2. The vertically (V) polarized pump component displaces to the north-east quadrant 3. Degenerate signal and idler pairs are produced via type-0 down conversion and enter the third beam displacer 4A. V polarized photons are displaced back to the south-east quadrant 5A. Polarization entangled signal and idler photons emerge from the interferometer 6A.

FIG. 19, Type 0 Non-degenerate: D polarized pump light enters the first beam displacer 1 in the south-east quadrant. The H polarized pump component displaces to the south-west quadrant 2. The V polarized pump component displaces to the north-east quadrant 3. Non-degenerate signal and idler pairs are produced via type-0 down conversion and are split into signal and idler paths via the dichroic. The signal and idler beams enter the displacers 4Ai, 4As where V polarized photons are displaced. H polarized photons are displaced by the displacers 5As, 5Ai. Polarization entangled signal and idler photons emerge from the interferometer 6As, 6Ai.

FIG. 20, Type 1 Degenerate: D polarized pump light enters the first beam displacer 1 in the south-east quadrant. The H polarized pump component displaces to the south-west quadrant 2. The V polarized pump component displaces to the north-east quadrant 3. Degenerate signal and idler pairs are produced via type-1 down conversion and enter the third beam displacer 4B. V polarized photons are displaced to the north-west quadrant 5B. Polarization entangled signal and idler photons emerge from the interferometer 6B.

FIG. 21, Type 1 Non-degenerate: D polarized pump light enters the first beam displacer 1 in the south-east quadrant. The H polarized pump component displaces to the south-west quadrant 2. The V polarized pump component displaces to the north-east quadrant 3. Non-degenerate signal and idler pairs are produced via type-1 down conversion in the wavelength conversion stage and are split into signal and idler paths via the dichroic. The signal and idler beams enter the displacers 4Bi, 4Bs where V polarized photons are displaced. H polarized photons are displaced by the displacers 5Bs, 5Bi. Polarization entangled signal and idler photons emerge 6Bs, 6Bi.

FIG. 22, Type 2 degenerate: D polarized pump light enters the first beam displacer 1 in the south-east quadrant. The H polarized pump component displaces to the south-west quadrant 2. The V polarized pump component displaces to the north-east quadrant 3. Degenerate signal and idler pairs are produced via type-2 down conversion and enter the third and fourth beam displacers 4C where V polarized photons are displaced. H polarized signal and idler photons are displaced by the fifth and sixth beam displacers 5C. Polarization entangled signal and idler photons emerge from the interferometer 6C.

FIG. 23, Type 2 Non-degenerate: D polarized pump light enters the first beam displacer 1 in the south-east quadrant. The H polarized pump component displaces to the south-west quadrant 2. The V polarized pump component displaces to the north-east quadrant 3. Non-degenerate signal and idler pairs are produced via type-2 down conversion and are split into signal and idler paths via the dichroic. The signal and idler beams enter the displacers 4Ci, 4Cs where V polarized photons are displaced. H polarized photons are displaced by the displacers 5Ci, 5Cs. Polarization entangled signal and idler emerge from the interferometer 6Cs, 6Ci.

Materials:

Below suggestions are meant to aid the designer with material choices for an embodiment.

Material Choices a) Wavelength conversion material: The double displacement interferometer configurations disclosed herein are aimed at wavelength conversion crystals that support co-linear phase matching. A short, but not exhaustive list of common conversion materials that are reasonably efficient at co-linear three wave mixing are the periodically poled versions of LiNbO3 or KTP. Semiconductor materials that can achieve SPDC are for example GaAs, but in these materials, it is often much more difficult to achieve co-linear phase matching. It should be emphasized that any material that can accomplish three wave mixing in a co-linear manner can be utilized in the double displacement configuration.

b) Displacer material: Any material that is capable of displacing the wavelengths required in the design can be used. A short, but not exhaustive list of common displacer materials are calcite (CaCO3) and vanadate (YvO4), and alpha-barium borate ($\square$-BBO). The designer may look to other materials, for example, LiNbO3 is a displacer as well as a non-linear wavelength conversion crystal and it may be beneficial to have both functions (displacement and conversion) accomplished by the same material.

Examples of Device Designs

Below are designs of optical wavelength conversion devices that may incorporate the double displacement interferometer for the six different phase matching scenarios. These designs utilize fiber coupling to assist with getting light into and out of the interferometer. It should be pointed out that the double displacement interferometer can be used in other coupling scenarios (E.g. free space input with fiber output, fiber input with free space output etc.). Temperature control and supporting optics and their associated design parameters are then chosen by the designer.

1) Device 1: Type-0 Degenerate:

A Type-0 degenerate device example is shown in FIG. 24. From left to right, the type-0 degenerate device 10 includes a fiber coupled input 11 which sets the input pump beam parameters to be very close to Gaussian, with a beam waist determined by the input fiber coupler parameters. Following the coupler is a polarizer 12 for cleaning the input light into purely linear polarization. The polarizer is followed by a half wave plate (HWP) 13, which can be fixed or rotatable. The HWP allows the angle of the linear polarized input pump light to be adjusted so that one of the arms of the interferometer can receive more or less light than the other. This can compensate for differences in conversion efficiencies between the two interferometer paths for example. The light then enters the double displacement configuration 14 for type-0 degenerate operation where it undergoes symmetric displacement, conversion and recombination. A removable beam block 15 is included to block wavelength conversion in one arm of the interferometer for diagnostic purposes but may not be required for certain applications. Finally, after the recombination section, any remaining pump is shown filtered out by a pump filter 16 before the light is coupled back into fiber at the output fiber coupler 17. Note that, depending on the purpose or application, any or all of the supporting optics may or may not be utilized in a type-0 degenerate device configuration.

2) Device 2: Type-0 Non-Degenerate:

A Type-0 Non-degenerate device example is shown in FIG. 25. From left to right, the type-0 non-degenerate device 20 includes a fiber coupled input 21 which sets the input pump beam parameters to be very close to Gaussian, with a beam waist determined by the input fiber coupler parameters. Following the coupler is a polarizer 22 for cleaning the input light into purely linear polarization. The polarizer is followed by a half wave plate (HWP) 23, which can be fixed or rotatable.

The HWP allows the angle of the linear polarized input pump light to be varied so that one of the arms of the interferometer can receive more or less light than the other. This can compensate for differences in conversion efficiencies between the two interferometer paths for example. The light then enters the double displacement configuration 24 for type-0 non-degenerate operation where it undergoes symmetric displacement, conversion, and where the recombination takes place in two separate signal and idler arms. A removable beam block 25 is included to block wavelength conversion in one arm of the interferometer for diagnostic purposes but may not be required for certain applications. Finally, any remaining pump is filtered out by a pump filter 26,28 before the light is coupled back into fiber at the signal and idler outputs 27,29. Note that, depending on the purpose or application, any or all of the supporting optics may or may not be utilized in a type-0 non-degenerate device configuration.

3) Device 3: Type-1 Degenerate:

A Type-1 degenerate device example is shown in FIG. 26. From left to right, the type-1 degenerate device 30 includes a fiber coupled input 31 which sets the input pump beam parameters to be very close to Gaussian, with a beam waist determined by the input fiber coupler parameters. Following the coupler is a polarizer 32 for cleaning the input light into purely linear polarization. The polarizer is followed by a half wave plate (HWP) 33, which can be fixed or rotatable. The HWP allows the angle of the linear polarized input pump light to be varied so that one of the arms of the interferometer can receive more or less light than the other. This can compensate for differences in conversion efficiencies between the two interferometer paths for example. The light then enters the double displacement configuration 34 for type-1 degenerate operation where it undergoes symmetric displacement, conversion and recombination. A removable beam block 35 is included to block wavelength conversion in one arm of the interferometer for diagnostic purposes but may not be required for certain applications. Finally, after the recombination section, any remaining pump is filtered out by a pump filter 36 before the light is coupled back into fiber at the output fiber coupler 37. Note that, depending on the purpose or application, any or all of the supporting optics may or may not be utilized in a type-1 degenerate device configuration.

4) Device 4: Type-1 Non-Degenerate:

A Type-1 Non-degenerate device example is shown in FIG. 27. From left to right, the type-1 non-degenerate device 40 includes a fiber coupled input 41 which sets the input pump beam parameters to be very close to Gaussian, with a beam waist determined by the input fiber coupler parameters. Following the coupler is a polarizer 42 for cleaning the input light into purely linear polarization. The polarizer is followed by a half wave plate (HWP) 43, which can be fixed or rotatable. The HWP allows the angle of the linear polarized input pump light to be varied so that one of the arms of the interferometer can receive more or less light than the other. This can compensate for differences in conversion efficiencies between the two interferometer paths for example. The light then enters the double displacement configuration 44 for type-1 non-degenerate operation where it undergoes symmetric displacement, conversion, and where the recombination takes place in two separate signal and idler arms. A removable beam block 45 is included to block wavelength conversion in one arm of the interferometer for diagnostic purposes but may not be required for certain applications. Finally, any remaining pump is filtered out by a pump filter 46,48 before the light is coupled back into fiber at each of the signal and idler outputs 47,49. Note that, depending on the purpose or application, any or all of the supporting optics may or may not be utilized in a type-1 non-degenerate device configuration.

5) Device 5: Type-2 Degenerate:

A Type-2 degenerate device example is shown in FIG. 28. From left to right, the type-2 degenerate device 50 includes a fiber coupled input 51 which sets the input pump beam parameters to be very close to Gaussian, with a beam waist determined by the input fiber coupler parameters. Following the coupler is a polarizer 52 for cleaning the input light into purely linear polarization. The polarizer is followed by a half wave plate (HWP) 53, which can be fixed or rotatable. The HWP allows the angle of the linear polarized input pump light to be varied so that one of the arms of the interferometer can receive more or less light than the other. This can compensate for differences in conversion efficiencies between the two interferometer paths for example. The light then enters the double displacement configuration 54 for type-2 degenerate operation where it undergoes symmetric displacement, conversion, and where the recombination takes place in two separate signal and idler arms. A removable beam block 55 is included to block wavelength conversion in one arm of the interferometer for diagnostic purposes but may not be required for certain applications. Finally, after the recombination section, any remaining pump light is filtered out by a pump removal filter 56 before the light is coupled back into two separate output fibers at the output fiber coupler 57,58. Note that, depending on the purpose or application, any or all of the supporting optics may or may not be utilized in a type-2 degenerate device configuration.

6) Device 6: Type-2 Non-Degenerate:

A Type-2 Non-degenerate device is shown in FIG. 29. From left to right, the type-2 non-degenerate device 60 includes a fiber coupled input 61 which sets the input pump beam parameters to be very close to Gaussian, with a beam waist determined by the input fiber coupler parameters. Following the coupler is a polarizer 62 for cleaning the input light into purely linear polarization. The polarizer is followed by a half wave plate (HWP) 63, which can be fixed or rotatable. The HWP allows the angle of the linear polarized input pump light to be varied so that one of the arms of the interferometer can receive more or less light than the other. This can compensate for differences in conversion efficiencies between the two interferometer paths for example. The light then enters the double displacement configuration 64 for type-2 degenerate operation where it undergoes symmetric displacement, conversion, and where the recombination takes place in two separate signal and idler arms. A removable beam block 65 is included to block wavelength conversion in one arm of the interferometer for diagnostic purposes but may not be required for certain applications. Finally, any remaining pump is filtered out by a pump filter 66,67 before the light is coupled back into fiber 68,69 at each of the signal and idler outputs. Note that, depending on the purpose or application, any or all of the supporting optics may or may not be utilized in a type-2 non-degenerate device configuration.

Methods

To achieve polarization independent conversion or to provide for the creation of maximally or high-quality polarization entangled photon pairs with the double displacement interferometer, it is preferable that the conversion process in each arm of the interferometer be effectively identical. While the interferometer theoretically accomplishes this, in practice there will be slight differences in various parameters such as efficiency and or optical losses between the two arms. Below are methods that can be employed for post fabrication tuning of these parameters.

a) Addressing the phase matching mismatch between conversion crystals via temperature tuning: A priori to fabrication, it is preferable to select the two non-linear crystals from the same material (processed identically etc.). However, the two non-linear crystals may still not be identically phase matched. A common technique to overcome this problem is to tune the phase matching of each non-linear conversion crystal independently by changing the individual crystal operating temperature. The double displacement interferometer configuration facilitates the individual temperature tuning of each crystal. For example, small individual resistive heaters or thermo-electric coolers can be placed in thermal contact with each crystal if required, and the operating temperature of each crystal can be controlled to equalize the phase matching of the two crystals. Each crystal can be tested individually, by for example monitoring the spectral output during operation, in order to verify the desired operating temperature.

b) Addressing different conversion efficiencies between the interferometer arms: Due to discrepancies in fabrication, and or differences in optical losses in each arm of the interferometer, the effective conversion efficiencies in the interferometer arms may not be equal. One method to overcome efficiency discrepancies is to make use of the fact that the non-linear optical conversion efficiency is dependent on the beam intensity. Thus, the effective efficiencies of the interferometer arms can be compensated by injecting more or less pump light into the appropriate arm. This pre-favouring of one of the interferometer arms to compensate for effective inefficiencies will not affect the polarization independent performance as, from an external perspective, the arms of the interferometer will appear to be equally efficient. In one embodiment, pre-favouring can be accomplished by the addition of a half wave plate (HWP) into the path of the pump light before the pump light enters the device. Since the displacers effectively split the pump light in a ratio that is dependent on the projection of the pump light polarization onto the optic axis of the displacer, then the amount of light displaced by the displacer can be tuned simply by rotating the HWP to achieve the necessary compensation.

c) Phase flipping and relative phase control: The double displacement interferometer relative phase can be controlled with passive components such as a HWP or Quarter Wave Plate (QWP) either acting on the pump beam before it enters the configuration or acting on the signal/idler beams after they leave the configuration. This process is known as pre-compensation/post compensation respectively. For example, in one embodiment, to flip the relative phase of the output state of polarization by 180 degrees, a HWP placed in front of the pump input, can be rotated 90-degree about the optical axis along which the pump propagates. In another embodiment, a QWP can be placed after the interferometer configuration to affect the relative phase in the just the output state. This process is known as post-compensation. The QWP is placed in one of either the signal or idler output beam paths. The QWP can be twisted slightly about a transverse axis to the direction of propagation. The beam translates slightly due to Snell's law, but there is an added effect which is that small changes in both the global and relative phase are induced on the final output state. Using these components to adjust optical phases in either pre or post compensation is well known by those skilled in the art.

d) Setting the basis of downstream polarization measurement systems: When used as a polarization entangled photon source, it is often useful to make polarization measurements of the output state with polarization measurement devices and or components. To align the polarization measurement device(s) or component(s) to the axis defined by the wavelength conversion crystals, it is very convenient to block the emission of one of the interferometer arms. This selects the optical output from only one of the two conversion crystals—the reference crystal—and defines the polarization of the output state to be fixed without regard to the input state polarization. This allows all other discrete polarization sensitive components to be aligned to the particular reference crystal by minimizing or maximizing photon counting or power type measurements. For example, if the wavelength converted output of the reference crystal is known to be horizontally polarized, all measurements of vertical polarization in the output light should be reduced or minimized. All intermediary polarization sensitive optical components (those that may effect the state of polarization of light) between the crystal and the polarization measurement device can then be set to keep the measurement reduced or minimized, thereby aligning the intermediary components to the vertical axis of the wavelength conversion crystal.

e) Device Operation in reverse (wavelength upconversion/sum frequency generation/second harmonic generation): The final optical configuration is time-reversible in the sense that the rays propagating in one direction may be reversed to accomplish the reverse wavelength conversion process. For example, the device that is constructed to support spontaneous parametric down conversion may be optically reversed to perform up-conversion via either second harmonic generation (degenerate operation) or sum/difference frequency generation (non-degenerate operation). One can simply inject light, at the output wavelength(s) back into the "output" of the device to generate light at the "input" of the device. Beam waist locations may be subject to change for optimization purposes, however, without adjustment, the device will work when pumping light in either the forward or reverse direction.

It will be appreciated that the above description relates to the preferred embodiments by way of example only. Many variations on the disclosure will be obvious to those knowledgeable in the field, and such obvious variations are within the scope of the disclosure as described, whether or not expressly described. For example, the ordering of any pair of displacers designed for either the signal, idler or pump may be reversed. The signal and idler paths for non-degenerate operation may be interchanged, and the directions need not necessarily be at right angles. A common application of the disclosure will be for creating polarization entangled photons, or effecting polarization insensitive wavelength conversion, but the disclosure is not limited to that.

In the preceding description, for purposes of explanation, numerous details are set forth in order to provide a thorough understanding of the embodiments. However, it will be apparent to one skilled in the art that these specific details are not required. The above-described embodiments are intended to be examples only. Alterations, modifications and variations can be effected to the particular embodiments by those of skill in the art without departing from the scope, which is defined solely by the claims appended hereto.

What is claimed is:

1. A double displacement wavelength conversion interferometer comprising:
   a pair of orthogonally oriented input beam displacers in an input beam displacement configuration;
   a pair of orthogonally oriented wavelength conversion crystals in a wavelength conversion configuration; and
   a plurality of orthogonally oriented output beam displacers in an output beam displacement configuration.

2. The double displacement wavelength conversion interferometer of claim 1 wherein the pair of orthogonally oriented input beam displacers displace an optical pump beam laterally by a distance, L, and wherein the plurality of orthogonally oriented output beam displacers displace both degenerate and non-degenerate signal and idler beams (converted wavelength) laterally by the distance, L.

3. The double displacement wavelength conversion interferometer of claim 2 wherein the input beam displacers are optically identical.

4. The double displacement wavelength conversion interferometer of claim 3 wherein the output beam displacers are optically identical.

5. The double displacement wavelength conversion interferometer of claim 3 wherein the output beam displacers comprise an idler arm and a signal arm.

6. The double displacement wavelength conversion interferometer of claim 5 wherein the output beam displacers in each idler arm are optically identical.

7. The double displacement wavelength conversion interferometer of claim 6 wherein the output beam displacers in each signal arm are optically identical.

8. The double displacement wavelength conversion interferometer of claim 2 wherein the beam displacers comprise YVO4, calcite or alpha-BBO.

9. The double displacement wavelength conversion interferometer of claim 2 wherein the wavelength conversion crystals comprise periodically poled non-linear optical material.

10. The double displacement wavelength conversion interferometer of claim 9 wherein the periodically poled non-linear optical material comprises periodically poled KTP (PPKTP) or periodically poled LN (PPLN).

11. The configuration of claim 2 wherein the wavelength conversion crystals are optically identical.

\* \* \* \* \*